United States Patent
La Fever et al.

(10) Patent No.: US 8,661,397 B2
(45) Date of Patent: Feb. 25, 2014

(54) SYSTEMS AND METHODS OF IMPLEMENTING REMOTE BOUNDARY SCAN FEATURES

(75) Inventors: George B. La Fever, Norwalk, CA (US); Carmy Yellin, Los Angeles, CA (US); Iser B. Flaum, Fullerton, CA (US); David R. Muse, Cypress, CA (US)

(73) Assignee: Electronic Warfare Associates, Inc., Herndon, VA (US)

( * ) Notice: Subject to any disclaimer, the term of this patent is extended or adjusted under 35 U.S.C. 154(b) by 0 days.

(21) Appl. No.: 13/605,888

(22) Filed: Sep. 6, 2012

(65) Prior Publication Data

US 2013/0091587 A1    Apr. 11, 2013

Related U.S. Application Data

(62) Division of application No. 12/641,627, filed on Dec. 18, 2009, now Pat. No. 8,296,613.

(60) Provisional application No. 61/144,980, filed on Jan. 15, 2009, provisional application No. 61/170,339, filed on Apr. 17, 2009.

(51) Int. Cl.
*G06F 17/50*    (2006.01)
*G06F 11/22*    (2006.01)
*G06F 9/44*     (2006.01)

(52) U.S. Cl.
USPC ............................ 716/136; 717/727; 717/728

(58) Field of Classification Search
USPC .................................. 716/136; 717/727, 728
See application file for complete search history.

(56) References Cited

U.S. PATENT DOCUMENTS

| | | |
|---|---|---|
| 5,070,448 A | 12/1991 | Crandall |
| 5,325,368 A | 6/1994 | James |
| 5,488,688 A | 1/1996 | Gonzales |
| 5,621,651 A | 4/1997 | Swooba |
| 5,706,297 A | 1/1998 | Jeppesen |
| 6,393,591 B1 | 5/2002 | Jenkins, IV et al. |
| 6,578,167 B2 | 6/2003 | Boorom et al. |
| 6,721,687 B2 | 4/2004 | Bartolome et al. |
| 6,766,305 B1 * | 7/2004 | Fucarile et al. ............ 705/51 |
| 6,842,865 B2 | 1/2005 | Nee |
| 7,017,081 B2 | 3/2006 | Gomez |
| 7,089,467 B2 | 8/2006 | Burch |

(Continued)

FOREIGN PATENT DOCUMENTS

EP    0 819 052    8/2001

OTHER PUBLICATIONS

U.S. Appl. No. 13/454,165.

(Continued)

*Primary Examiner* — Suresh Memula
(74) *Attorney, Agent, or Firm* — DLA Piper LLP (US)

(57) ABSTRACT

A system and method for remotely performing boundary scans on a circuit board, device and/or system across a network. A first computing component, connected to the network, includes a computer readable media including computer executable instructions. The instructions cause the computing component to maintain or access a library of test scan procedures for a plurality of subject circuit boards. At least one of the test scan procedure is downloaded to a second computing component proximate the circuit board, device and/or system. The second computing component and the test scan procedure are monitored and controlled remotely via the network.

20 Claims, 16 Drawing Sheets

(56) References Cited

U.S. PATENT DOCUMENTS

| | | |
|---|---|---|
| 7,095,718 B1 | 8/2006 | Terry |
| 7,203,842 B2 | 4/2007 | Kean |
| 7,215,580 B2 | 5/2007 | Gorobets |
| 7,237,161 B2 | 6/2007 | Volz |
| 7,249,172 B2 | 7/2007 | Ollive et al. |
| 7,287,190 B2 | 10/2007 | Rosenman et al. |
| 7,366,955 B2 | 4/2008 | Kuturianu et al. |
| 7,376,917 B1 | 5/2008 | Lazarut et al. |
| 7,429,915 B2 | 9/2008 | Cruzado |
| 7,463,652 B2 | 12/2008 | Karol |
| 7,526,679 B2 | 4/2009 | So |
| 7,539,900 B1 | 5/2009 | Plofsky |
| 7,543,275 B2 | 6/2009 | Kuturianu et al. |
| 7,558,966 B2 | 7/2009 | Durham |
| 7,739,517 B2 | 6/2010 | Sahita |
| 7,801,050 B2 | 9/2010 | Mitra |
| 7,817,484 B2 | 10/2010 | Demone |
| 2002/0138801 A1 | 9/2002 | Wang |
| 2003/0041286 A1 | 2/2003 | Beerom |
| 2003/0101042 A1 | 5/2003 | Ollive |
| 2003/0140291 A1 | 7/2003 | Brown et al. |
| 2003/0217306 A1* | 11/2003 | Harthcock et al. ............... 714/30 |
| 2004/0064764 A1 | 4/2004 | Gomex |
| 2004/0158784 A1 | 8/2004 | Abuhamdeh |
| 2004/0250150 A1 | 12/2004 | Swoboda |
| 2005/0216895 A1 | 9/2005 | Tran |
| 2005/0262465 A1* | 11/2005 | Goyal ............................. 716/18 |
| 2006/0059387 A1 | 3/2006 | Swoboda |
| 2006/0136751 A1 | 6/2006 | Bonaccio |
| 2006/0200718 A1 | 9/2006 | Halliday |
| 2006/0242499 A1 | 10/2006 | Volz |
| 2007/0001528 A1 | 1/2007 | Umegaki et al. |
| 2007/0052809 A1 | 3/2007 | Hammadou |
| 2007/0291906 A1 | 12/2007 | Halliday et al. |
| 2008/0034334 A1 | 2/2008 | Laouamri |
| 2008/0098380 A1 | 4/2008 | Klusmeyer |
| 2008/0137543 A1 | 6/2008 | Mitra |
| 2009/0177830 A1 | 7/2009 | Orion |
| 2009/0210763 A1 | 8/2009 | Eckelman |
| 2009/0307546 A1 | 12/2009 | Dunn |
| 2010/0174955 A1 | 7/2010 | Carnevale |
| 2010/0180169 A1 | 7/2010 | La Fever |
| 2010/0281318 A1 | 11/2010 | Redondo |

OTHER PUBLICATIONS

Supplementary European Search Report issued in EP 09838570.1 on Mar. 15, 2013.
International Search Report issued in PCT/US2009/068666 on Aug. 17, 2010.
Written Opinion issued in PCT/US2009/068666 on Aug. 17, 2010.
International Search Report issued in PCT/US2012/034735.
Written Opinion issued in PCT/US2012/034735.
U.S. Appl. No. 12/641,627.
U.S. Appl. No. 13/661,596.
Related U.S. Appl. No. 13/454,165.

* cited by examiner

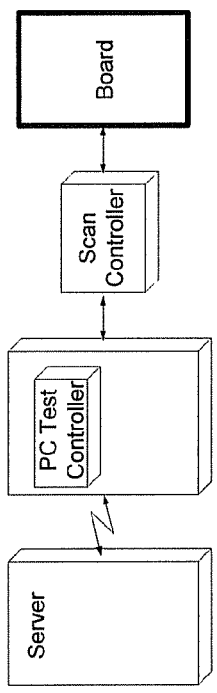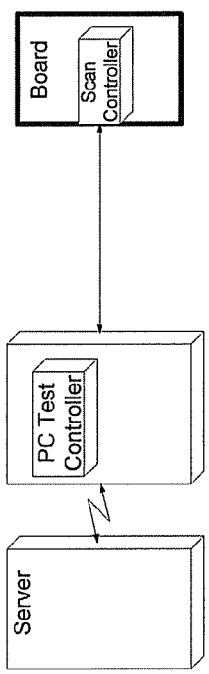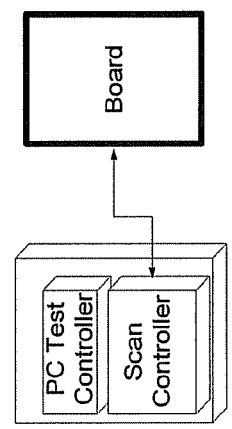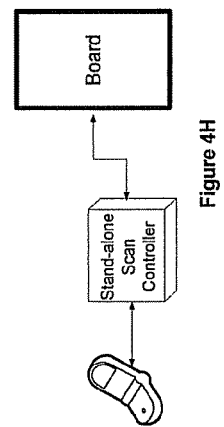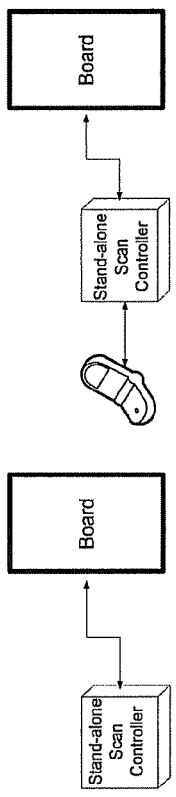

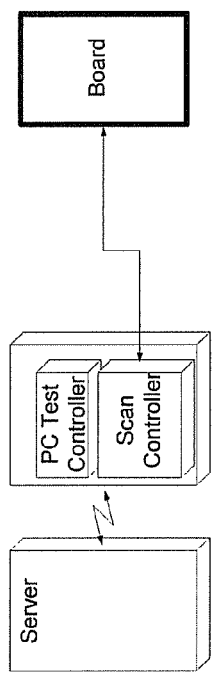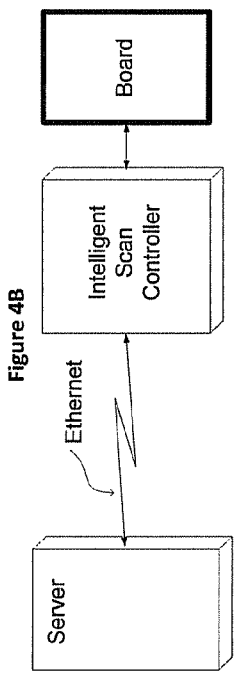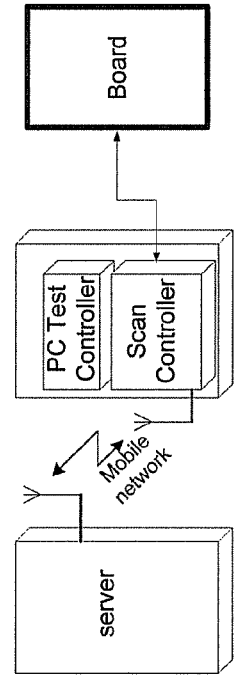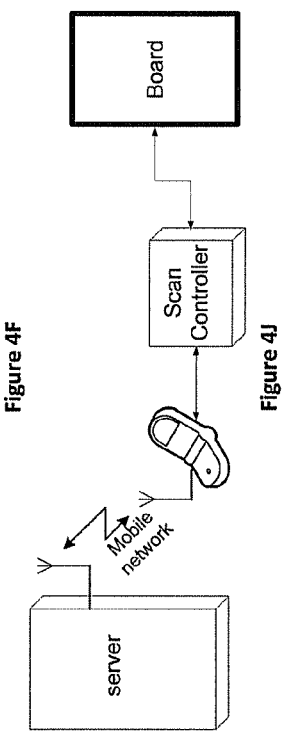

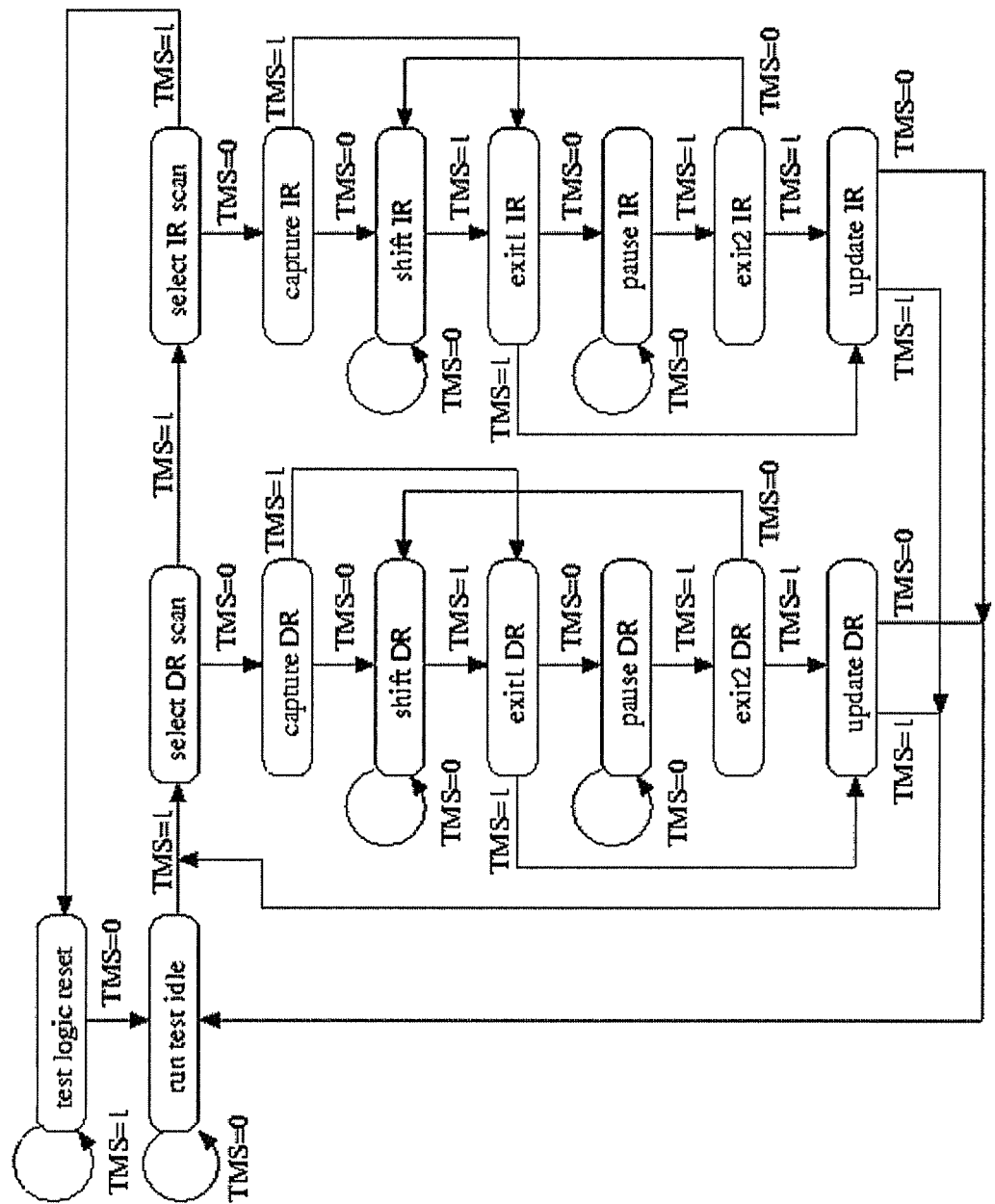

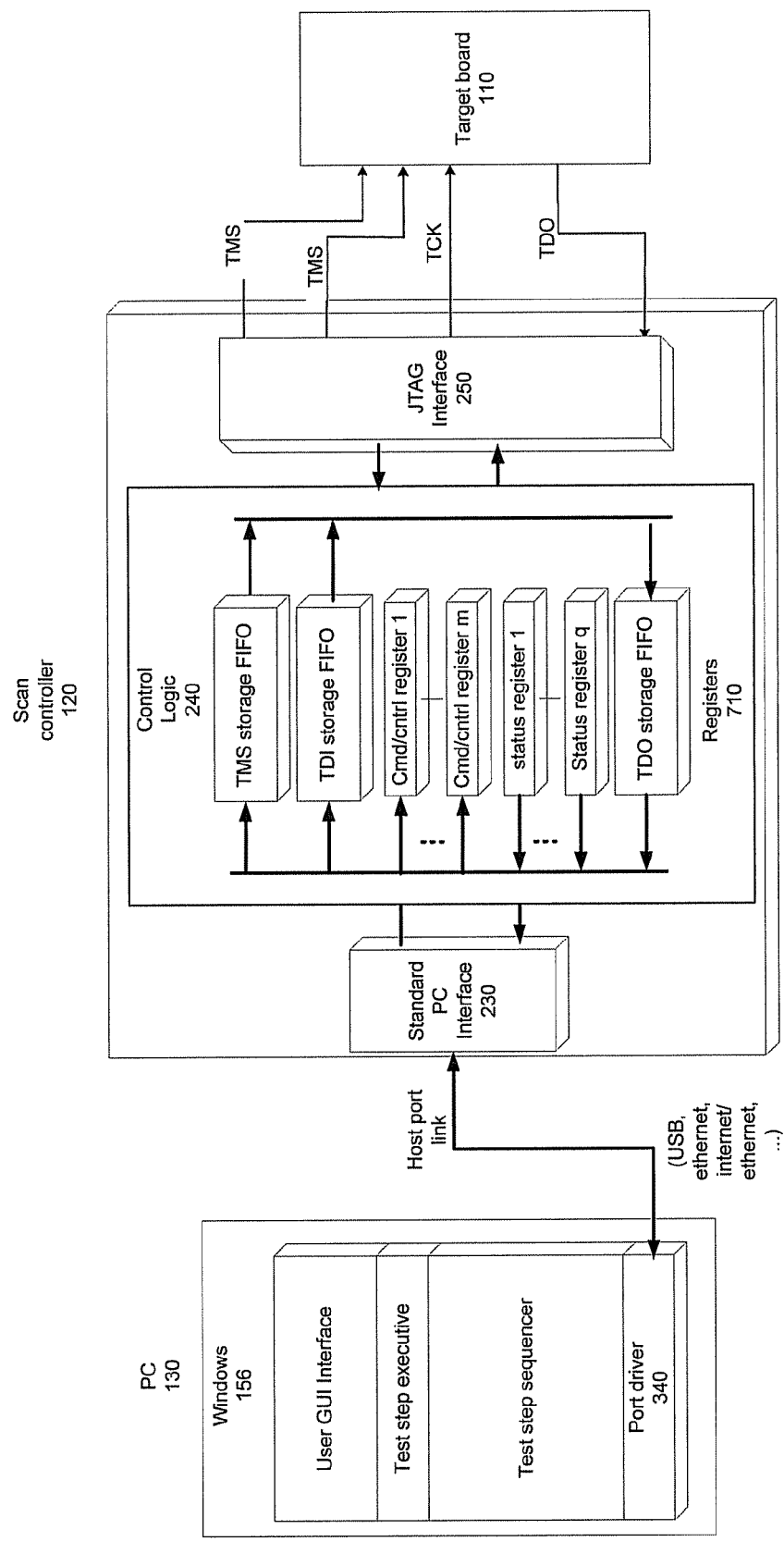

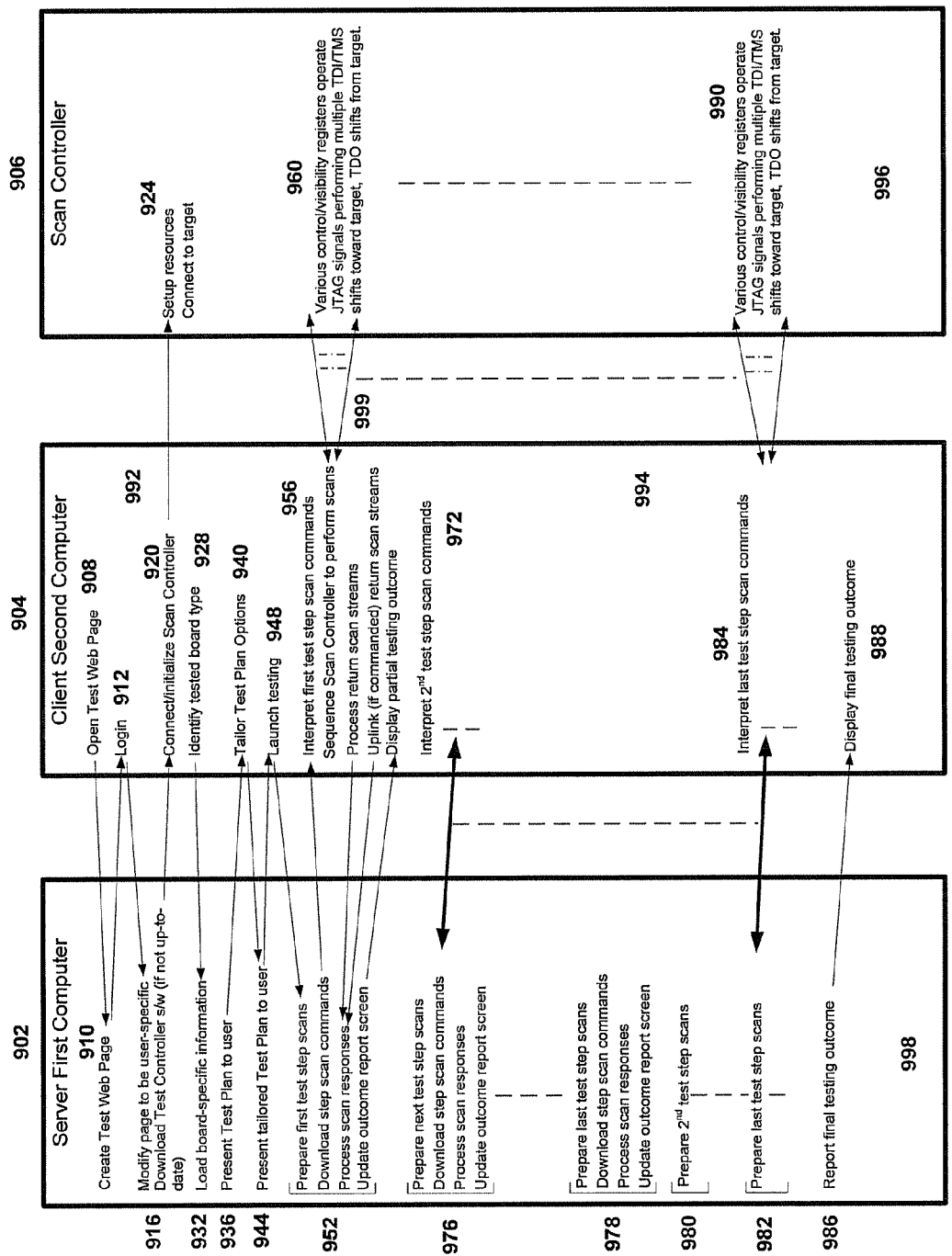

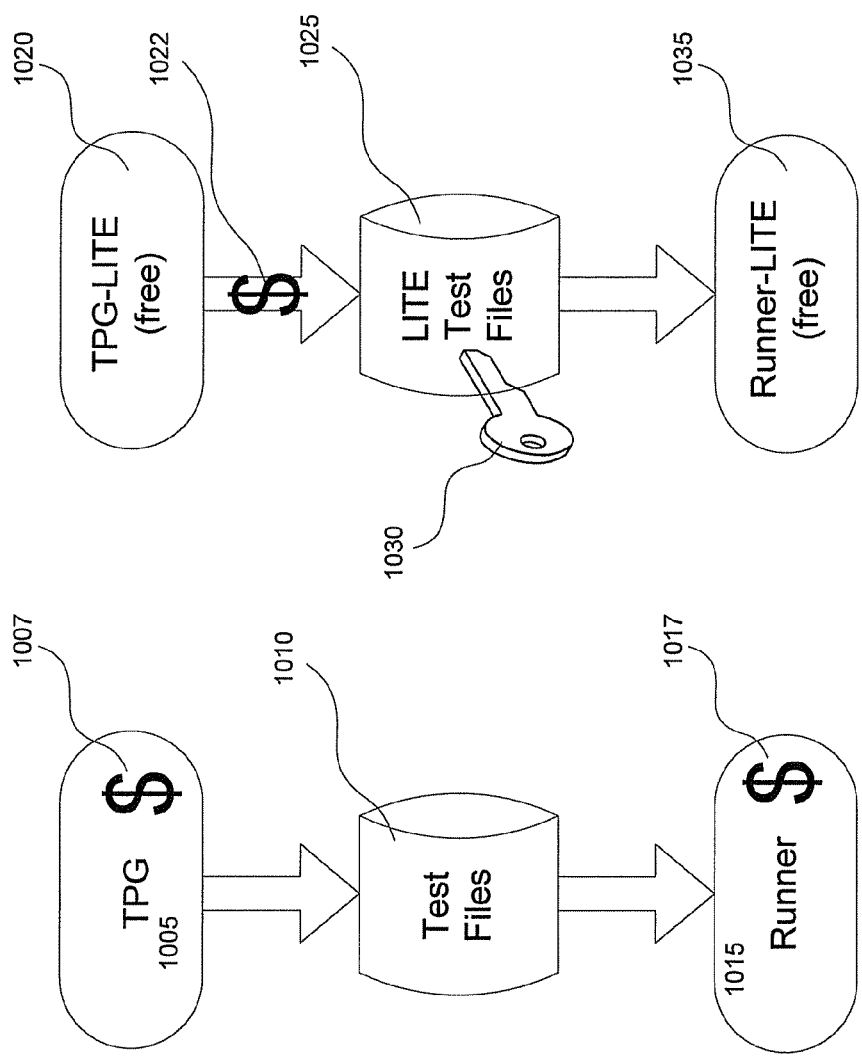

SYSTEMS AND METHODS OF IMPLEMENTING REMOTE BOUNDARY SCAN FEATURES

CROSS-REFERENCE TO RELATED APPLICATIONS

This application is a divisional of U.S. application Ser. No. 12/641,627 filed Dec. 18, 2009. U.S. application Ser. No. 12/641,627 filed Dec. 18, 2009 claims the benefit of the filing date of U.S. Provisional Patent Application Nos. 61/144,980, filed Jan. 15, 2009 and 61/170,339, filed Apr. 17, 2009, which are herein incorporated by reference.

BACKGROUND

1. Technical Field

The present invention relates to testing circuit boards, devices and/or systems, and, more particularly, to systems and methods of performing boundary scans of integrated circuit (IC) devices remotely via a browser interface.

2. Description of Related Information:

Board level manufacturing and associated test applications often utilize boundary scan (also known as JTAG) functionality, a low-cost, integrated method for electrically testing components/interconnects on printed circuit boards (PCBs) that is implemented at the IC level. Boundary scan systems typically employ a scan controller unit that is physically connected to a computer via an i/o port in turn connecting to the board, or installed within the computer, or installed on the board itself, interacting with the board circuitry to be tested. Existing systems for performing boundary scan now include the capability of scanning remotely via the internet, using ethernet based scan controllers. However, such implementations are either exceedingly slow or require an intelligent scan controller locally and directly plugged to an Ethernet socket and replicating the algorithms of the above computer. Furthermore, systems exist that enable remote control of computer components or subcomponents via the interne and an i/o port (such as a USB port).

SUMMARY

Systems, methods, and articles of manufacture consistent with the invention are directed to performing boundary scans of integrated circuit (IC) boards remotely via an Internet browser interface. Additionally, systems or other methods are included where remote boundary scanning is linked via a mobile phone service or other network. The term 'network' throughout the following shall refer to widespread electronic connectivity using either internet or mobile phone networks supporting communications between information source and sink among devices. Further, aspects of the remote boundary scan innovations herein may include the usage of portable scan controller hardware attached to subject test circuits while testing in a stand-alone manner without the need for a separate connected computer, wherein such hardware may also be preloaded with test information and/or store results that are collected for later recall of test outcome(s).

Some exemplary implementations may include operating a local computer with network access which is co-located with the boards. By means of such approaches, board boundary scan testing can be performed without the need for any special software installed in such local computer, when a compatible scan controller unit is connected between the local computer and the device/board/system under test.

In one exemplary implementation, there is provided a method of enabling management of a boundary scan of a circuit board and/or devices and/or systems remotely over a network connection. Moreover, the method may include processing a request to perform a boundary scan of a subject board, accessing a library of scan test procedures, otherwise known as test plans and/or test vectors, specifically designed for a plurality of circuit boards and/or devices and/or systems, and downloading at least one of the scan test procedures designed for the subject board to the local computing component via a browser service. One or more further implementations may include features of managing, from a remote computing component, the local computing component and at least one test scan procedure remotely, via the network, to control performance of the boundary scan on the subject board.

Another exemplary implementation may include a preloaded setup scheme in which boundary scan test procedures for one or more circuits may be recorded into a stand-alone scan controller prior to running the test. Such features may obviate the need for any computer during the test operation in proximity to the tested circuit, with results recorded for later upload to a computer, as well as being available for immediate summary indication. An adjunct capability included in such a stand-alone scan controller is the provision of flexible user control and visibility by means of an external mobile phone, which may serve both as an interactive console as well as a link to the mobile phone communications network and connected resources.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

Reference is made to the attached drawings, wherein elements having the same reference designations represent like elements throughout and wherein:

FIGS. 4A, 4B, 4C, 4D, 4E, 4F, 4G, 4H, 4J, 4K, 4L, and 4M are diagrams of different remote boundary scan systems according to several exemplary implementations;

FIG. 6 is the protocol defined state diagram of a JTAG test access port according to an exemplary implementation;

FIG. 7A is a block diagram of exemplary local distinct computing elements showing one of several standard port interfaces to a scan controller, including some common functional elements within for performing a boundary scan according to an exemplary implementation;

FIG. 9 depicts various exemplary computer/controller components and associated messaging/functional features, according to certain exemplary implementations;

FIG. 10A is a diagram of an existing arrangement used to run boundary scans; and FIGS. 10B-10D are diagrams illustrating exemplary transactional/licensing arrangements associated with the present remote boundary scan innovations, according to certain exemplary implementations.

DETAILED DESCRIPTION OF SEVERAL IMPLEMENTATIONS

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Exemplary Architecture

Figure 1:
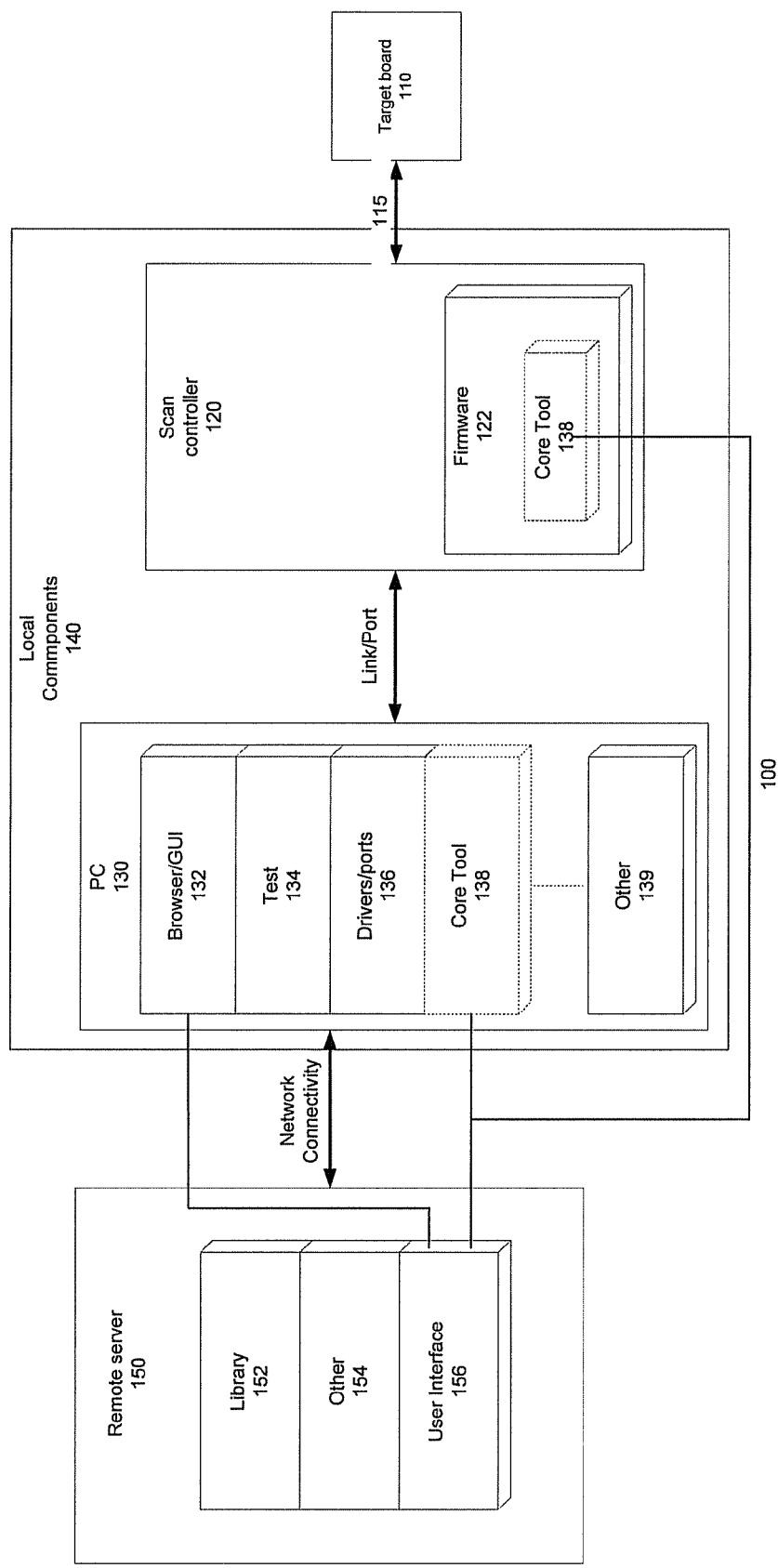
FIG. 1 is a block diagram of a system of boundary scan components according to an exemplary implementation.

FIG. 1 is a block diagram of a system 100 of boundary scan components according to an exemplary implementation. Target board, device or system 110 is connected to a scan controller 120 via a interface or connector 115 (JTAG protocol) to perform testing of the board, device or system 110. The following description will relate to a board 110, although the description also applies to a device or system. Together with a computing component 130, such as a personal computer, and scan controller 120 represent local components placed within immediate proximity to the test board. These local components 140 may be part of a unitary local processing system, such as a personal computer that may house both elements as well as even the target board 110, or their functionality may be distributed into two or more subcomponents, as shown and described throughout. Local components communicate with a remote server 150 over a network by means of a browser/GUI 132 subcomponent in computing component 130. Remote server 150 includes, inter alia, a library of board-specific information and test scans 152, user interface 156 components/functionality, in addition to other software, such as scan controller hosting software 154. In addition to the browser/GUI 132, computing component 130 also includes one or more testing components 134, drivers and port/connectivity related components 136, as well as other boundary scan components 139. Further, a core boundary scan tool component 138 may reside in the computing component 130, or it may be part of the firmware 122 installed on the scan controller 120.

In one exemplary implementation, interface or connector 115 may be a JTAG connector associated with an increasing quantity of circuit boards and/or devices and/or systems. The JTAG connector supports a test interface to the outside world for the board. It passes signals which drive toward integrated circuits (ICs) accessible via the JTAG port to provide sequential shift in bits, feed control and clock signals to all the participating ICs, and to extract sequential bits as collected along the chain. Further, the JTAG connector may, in some implementations, be indirectly operated by a host computer, such as a PC. Here, the PC software may determine the particular test pattern to use, and may also identify a particular meaning for these patterns (type of scan), as modified by the control signals, applied to the subject patterns. The software may also collect the stream back to the PC for analysis, wherein it may interpret the data according to the type of scan cycle just completed. In some implementations, however, the software may not be cognizant of the exact timing and protocol sequencing of the signals since they are scanned into/out-of the chain at the electrical level. In these implementations, then, the JTAG specific scanning protocol is normally handled by intermediate scan controller hardware, under PC direction. These implementations typically include dedicated hardware or firmware that afford faster scan shift processing (expediting the potentially large number of permutations to run and long chain length) than is otherwise available via software over PC ports, which cannot enable such higher rates. Such scan controllers can also facilitate other electrical requirements peculiar to the board under test, such as special voltage levels, not readily accommodated by the computer directly.

Figure 2A:
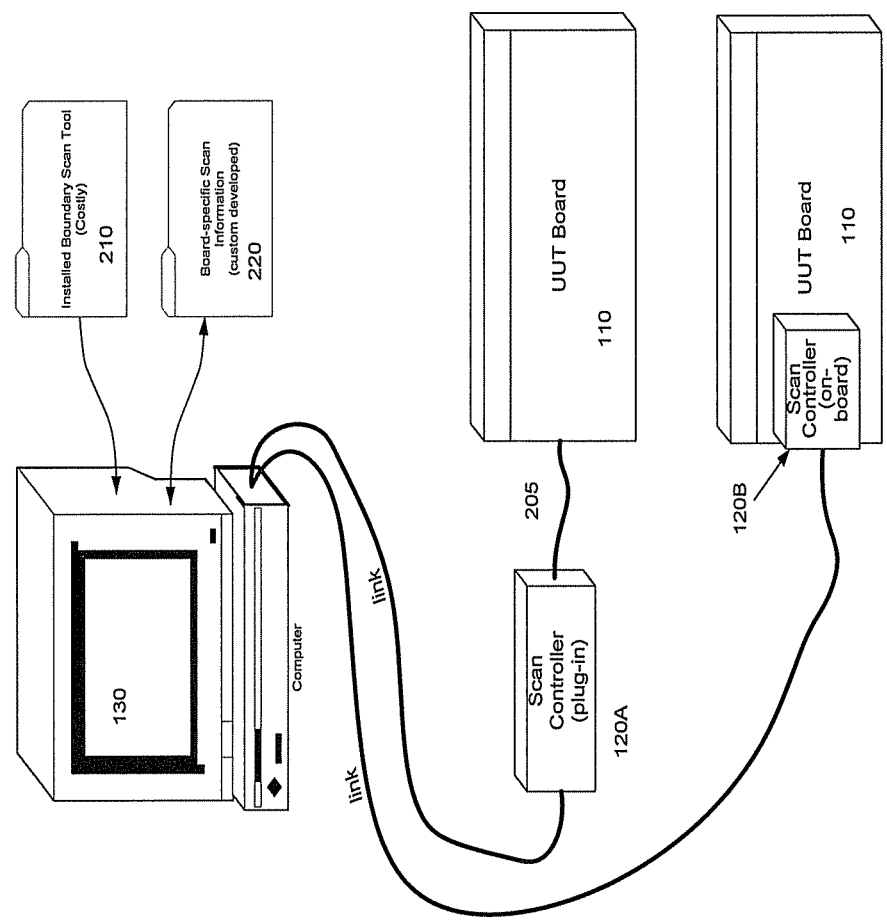
FIGS. 2A-2B are block diagrams of a boundary scan system and a scan controller, respectively, according to an exemplary implementation.

Conveyance of scan patterns and the type of scan cycle to perform is commanded to a particular scan controller by the PC according to that hardware's or firmware's interface using a standard link (USB, parallel port, embedded PCI port, Ethernet, serial port, etc.). It similarly extracts the collected bits back to the PC over this port. For example, each unique scan controller is operated by the software according to its own command rules, as conveyed by the port convention. The scan controller then produces the JTAG standard signal sequences to scan to/from the target according to JTAG rules. As shown in FIG. 2A, such a scan controller may connect to the target at the JTAG attachment point, usually a dedicated connector, via a controller-specific cable 205. FIG. 2A illustrates two implementations of the scan controller 120. First, a distinct or plug-in scan controller 120A is a component that may contain a greater range of the features and functionality set forth herein. Second, FIG. 2A also illustrates an on-board scan controller 120B. For example, an on-board scan controller 120B may be a scan controller that has the form-factor of an electronic device (like a hybrid or large IC) that is connected or soldered directly onto the target (i.e., as with all other ICs). In this case, the PC link would go directly to the board through a dedicated connector that routes to this on-board scan controller. The more complex types of scan controller 120B may be pre-loaded with scanning software specific to the board/boards, ports, etc. with which it is associated, avoiding the need to download such environment-specific software in some of the implementations herein. The on-board implementation eliminates the cable between the scan controller and the target and otherwise yields improved performance. Another advantage of such scan controllers is the ability to enable scans even in the deployed location without external special test hardware. Several example of features that may be installed in the computing component 130 for either implementation are also shown in FIG. 2A. These features may be installed by known techniques, such as via added firmware, as part of downloaded driver components, etc. For example, computing component 130 may be installed with a relatively complete boundary scan software tool 210, which in such case does not require communications with the remote server 150. Further, computing component 130 may be loaded with the salient board specific scan information 220. This information is the test information specific to the particular board 110 to be scanned and may also be downloaded from the library contained in the remote server 150.

Figure 2B:
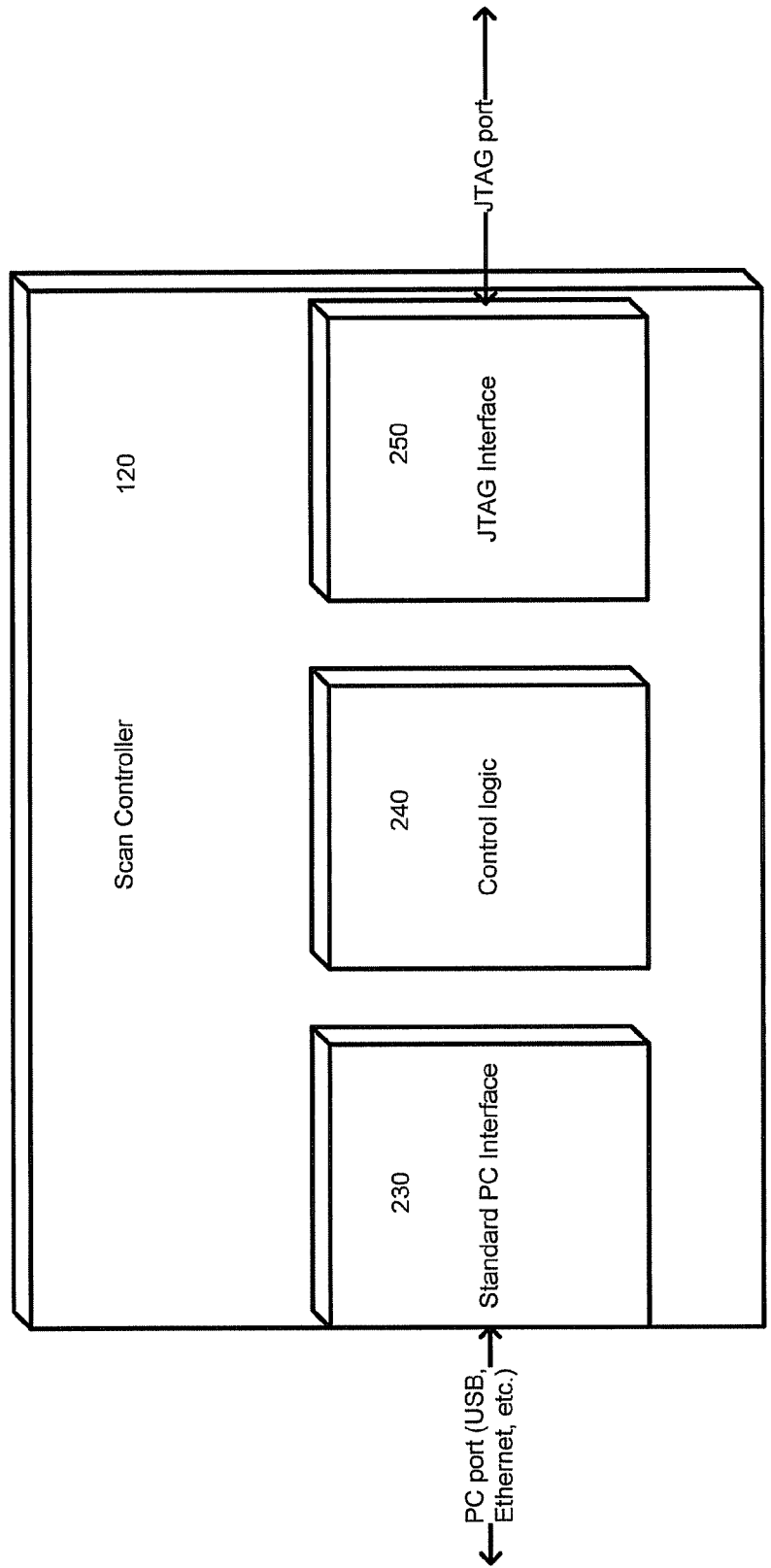

Accordingly, such scan controllers may include or be loaded with hardware, firmware and/or software subcomponents configured to do one or more of the following: (1) interface with the host PC (or any computer) via one of several standard link protocols (USB for example), depending on the controller model; (2) interface with the target according to the JTAG protocol at high speeds (much faster than a PC could typically directly operate it with its standard ports); (3) accept commands from the host which launch specific types of scan sequences through the target JTAG chain; (4) accept bit patterns from the host PC to shift toward the target scan chain; (5) collect return bit patterns from the target and convey them back to the PC; (6) create the proper serial bit stream signal pattern toward the target; (7) create the proper timing and control signal sequences to operate the JTAG shifting according to that specification; (8) provide peculiar electrical signal conditioning as required by the connected board (such as voltage level or signal rise/fall rates); and/or (9) provide any additional setup and status functions to facilitate the PC managing this controller. FIG. 2B illustrates a generalized structure of an exemplary scan controller 120 that may be configured with one or more of these features, wherein the appropriate scan processing is performed. While this basic structure and scan controllers, in general, are well known, installation and operation of certain features herein enable innovative management/control of scan controllers and/or scan controller functionality remotely. As to operation, control logic 240 receives information from and transmits communications to the computing component 130 and the board 110 via interface 230, which may be a standard PC interface in certain implementations, and JTAG interface 250, respectively.

Test Set-Up

Boundary scan processing typically entails numerous scans of bit patterns through the target board's chain, always feeding a stream of bits to the ICs, and extracting a stream of bits from the ICs. The exact sequence and content of such scans is defined by a test plan and supporting files. Test software is then used to interpret all the returned scan patterns as the plan is stepped through to make decisions about circuit defects or operability. This test plan is typically created off-line ahead of the test runs based on detailed board-specific information contained in various files, such as its set of IC's and components BOM (bills-of-material), information regarding how all component pins are connected (net list), circuit topology (how the JTAG ICs are ordered in the chain), BSDL (boundary scan description language) of each JTAG IC (defines how the chain is hooked up and operated inside the IC), and additional engineering information to further qualify the testing. Each target board design requires its own unique set of such files to fully characterize how the test software will drive the scanning to complete the test.

The creation of this test plan and incorporation of all this information into the remote library 152 requires an intensive development cycle by engineers fully familiar with the target board design. This can be done with the aid of assist software, such as the Corelis TPG (test plan generator) tool. When finally completed, the test plan file fully prescribes the scan sequences to accomplish the test and enable fault detection decisions by the test run software. Often this task is contracted out to specialists, such as the boundary scan test tool vendor (including Corelis) given the expertise required. Once completed, the downloaded boundary scan test tool may be enabled to perform the complete target scanning and test operation via access to this information in a library.

Remote Library of Supported Target Circuit Boards and/or Devices and/or Systems

The remote server 150 includes features and functionality to support the user community in the perusing, uploading and maintaining the library of test plans of testable circuit boards and/or devices and/or systems. Remote library 152 is a centralized circuit board and/or devices and/or systems testing resource, available for world-wide access, containing board-specific information enabling easy testing and boundary scan functionality by board end-users. As set forth herein, only a browser enabled PC and a local scan test controller/scan controller driver is required to utilize its resources. The set of scan controllers that the remote server supports is also dynamic, and may include the capability of supporting third party vendor models, in addition to those offered by the remote server vendor itself.

Local and Remote Architecture

As explained herein, various boundary scan features and functionality are operated by components local to the target while other control algorithms are still operated in the remote web server. Additionally, while it is not always the case, the majority of the main application may be pre-installed or otherwise already reside at the local computing component 130. This avoids the need for web users to install it at test run time. Further, the board-specific information (test plans, etc.) for an assortment of targets is maintained in the remote server 150 library 152 for world-wide access.

Figure 3:
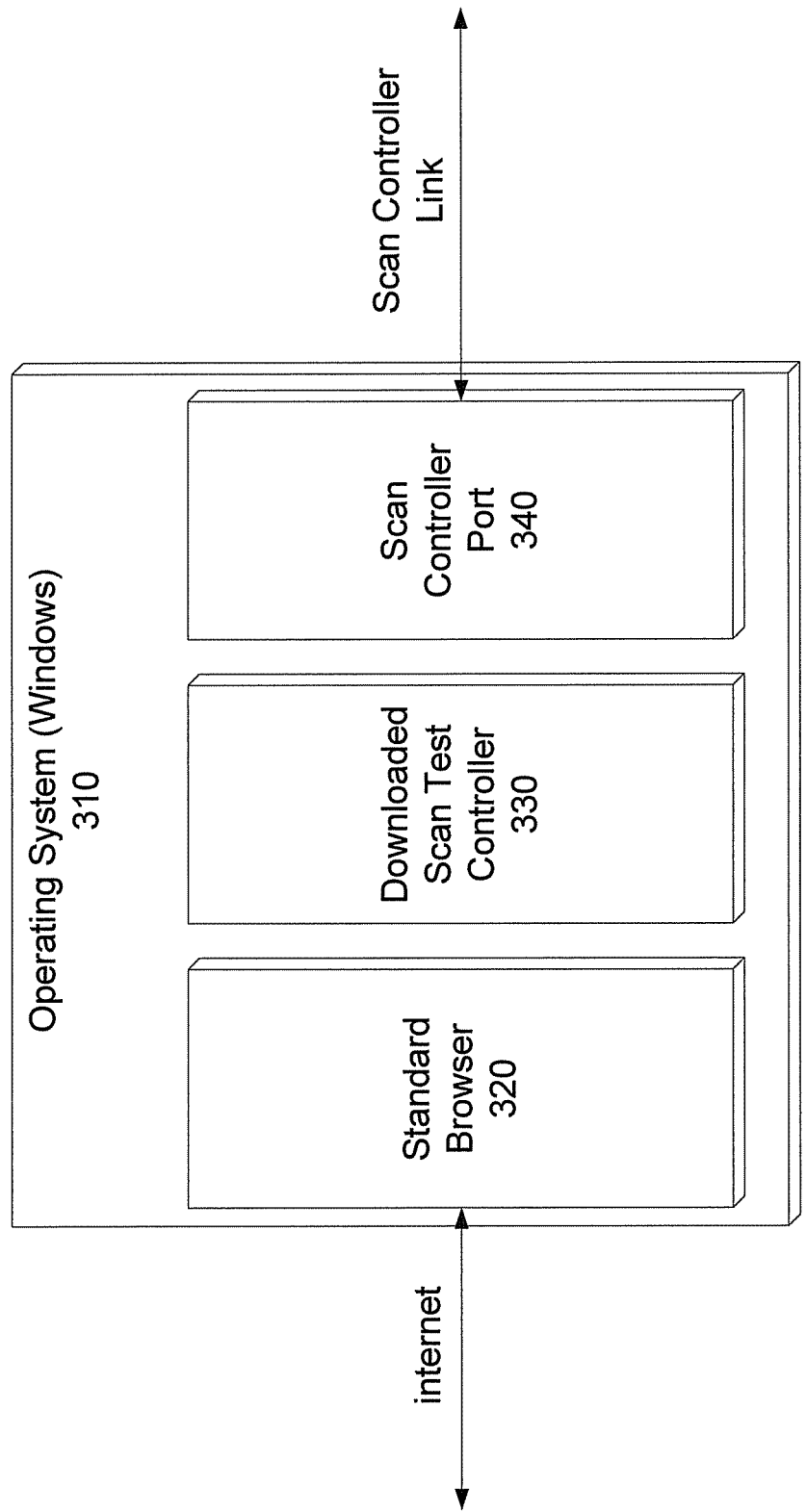
FIG. 3 is a block diagram of local computing components that performs boundary scan running within a computer operating system according to an exemplary implementation.

According to some exemplary implementations, a local test run user utilizes a standard web browser, a set of downloaded software, drivers and/or plug-ins, and a compatible scan controller 120 plugged into the target board 110. Such user would log into the tool provider remote web site, identify the particular board to test, and open an application window to utilize the scan controller features via the local PC software. See FIG. 3 which shows the software elements in an exemplary operating system 310 and standard browser 320 utilized, e.g., in the user PC. At this time, or prior thereto if the user had previously accessed the tool provider web site, a scan test controller/driver 330 would be installed on the user's PC. When installed, this local controller/driver would be hidden from and not accessible to the user, directly, but controlled via interaction with the remote server 150. Information, such as test scan instructions, are then transmitted to the scan test controller 120 via a scan controller port 340, typically also downloaded from the remote server 150. Further, as set forth in connection with FIG. 5, below, the local scan test controller can have a user interface with functionality similar (or identical) to that provided by existing scan controllers.

The scan test controller 330 includes a utility that also enables a web user browser to enable its local PC port (USB, etc.) to be operated by an network linked server. This utility may be a custom ACTIVEX module (or similar) or require the installation of a custom driver application which links to the browser sharing information in both directions (directly or via file transfers, etc.). Once this utility is installed, the tool vendor's remote software will gain the ability to direct or operate the scan test controller 330 and even devices attached to the port linked to the scan controller. This enables the essential resources required to perform a series of scans and complete the testing. Once the server can send commands to and receive status from the local scan controller and port, it will have the same visibility of this resource as a locally installed version of the tool. This applies also for the case of a remote server linked over a mobile phone network to a local mobile phone or over any network to a portable device.

The core structure of the boundary scan running tool remains unchanged, i.e., reading the existing appropriate test plan plus supporting information to create a sequence of boundary scans, and interpreting the return scanned information to localize board defects or perform the other JTAG capabilities. However, new features for this invention of the downloaded scan test controller 330 include: (1) projecting the usual tool screen menus, buttons, and display information to be observed at the client local PC, while up-linking user entered keyboard and mouse interactions back to the server. This includes depicting any outcome results of the testing, as if the application were installed at the client local PC; (2) sensing inputs and selections made at the local client PC by the user to operate the software features as if it were installed at the client; (3) conveying control sequences down through a computing component 130, enabling it to be routed via the scan controller for operation on the target to produce JTAG scans toward and from it. This also includes transmitting bit patterns toward the target and any processing commands to operate the scan controller; and (4) conveying return scanned in bit patterns collected by the connected scan controller back up to the remote server such that it can be interpreted as if it were locally connected. This includes status information from the scan controller back to the server, as if it were being locally controlled.

One feature of the innovations herein is control of a remote client I/O port (like USB or Ethernet) via the browser. This application is typically intentionally insulated from the core operations of the local PC for security purposes by browser and operating system design. Even installed applications resident on the PC access such ports indirectly by hooks provided by the operating system (such as Windows), and require driver routines to enable this interaction. The downloaded driver and ACTIVEX (or similar) implementations, enable maintaining PC security via network control and/or authentication of PC resources. For example, a one-time downloaded application, such as one installed vis-à-vis a local web server (e.g. Apache, etc.), may be employed to enable network control and authentication of pc resources. Once installed, some exemplary implementations may remain resident, upgradeable, and/or obfuscated for future log-ins and test runs, etc., while also offering access to the local scan controller tool only through the remote server 150. In other implementations, keys/critical pieces of such software may be withheld, which may then be downloaded/unencrypted in a controlled manner, such as only at log-in, run-time, etc. Security may then be maintained via standard authentication mechanisms, software, processes, etc. Such control features are implemented transparent to users, and integrated into the browser functionality and readily accessed by the user with a few mouse clicks during normal web site log-in sessions.

At the remote server 150 end, remote software elements are used to manage or redirect input/output visibility or control screens on the local computing component 130. Additional command overhead is utilized to operate the local client's ACTIVEX or port control application, directing it to further convey information to or from the scan controller port.

FIGS. 4A, 4B, 4C, 4D, 4E, 4F, 4G, 4H, and 4J show various exemplary configurations of the major scan controller installations which are envisioned at the local board test location. These apply to existing methods as well, when the remote server connection is removed and the entire application is installed in the local PC. FIG. 4A depicts one exemplary configuration where the scan controller is a distinct component between the PC and the board under test. Here, for example, the scan controller may connect to the PC via one of several standard PC ports with appropriate cabling, and it may connect to the target board via a dedicated cable conveying JTAG signals. FIG. 4B illustrates an exemplary scan controller installed inside the PC such that the processor communicates with it via internal resources, such as the PCI bus, similar to other adapter cards. The connection to the target board, here, may be similar to the above JTAG hookup. FIG. 4C illustrates an exemplary scan controller installed on the target board itself, when utilizing a version whose form-factor enables such mounting directly on the printed circuit board. Here, the connection to the PC uses a similar cable and port as FIG. 4A, although no cabling is required for the JTAG signals, being directly wired into the board using its signal routing traces.

FIG. 4D shows a significant departure configuration from the above, wherein the scan controller has incorporated the functionality of the local PC within itself using its own increased processing capability, and having an interface directly pluggable into the Ethernet, including network access. In such case, the remote server can communicate directly with the scan controller, without an intervening PC, and allow the latter's advanced processing power to perform scans of the board. This approach may involve significantly greater complexity and hardware cost. As such, other implementations may be preferred, due to more common availability of the subcomponents at lower costs, and supported by the ubiquitous availability of inexpensive PC computers.

FIG. 4E shows an exemplary configuration where the scan controller is bundled inside the computer, offering the combined capability as a single instrument. For the case that this is in the form-factor of a laptop, notebook, netbook, or similar hand-held PC, it can serve as a highly portable self-contained scan controller. Here, the network link is not normally connected and such portable application is useful where access to target circuits are difficult to access and/or remotely located compared to a typical test facility. A variant of this, as in FIG. 4F, includes a wireless mobile network modem to such portable application restoring the remote server control capabilities above in the portable bundled form-factor.

Another exemplary configuration is shown in FIG. 4G where the scan controller may be a stand-alone instrument with no computer hookup while running tests on a target circuit. This version of instrument includes on-board intelligence and memory enabling the scanning of one or more specific target types according to test procedures pre-loaded at another time and/or location, or contained in removable memory elements. Such implementations make boundary scan testing feasible in difficult to access or remote locations where transporting test equipment is prohibitive.

Still another exemplary configuration may employ the above stand-alone scan controller in conjunction with a connected mobile phone serving as its user visibility/control console, shown in FIG. 4H. By means of firmware in the scan controller running in its embedded processor, and by virtue of its hookup to the mobile phone (typically via USB) the latter's functionality is conscripted from normal usage exploiting its screen, keyboard, and sound i/o resources to enable greater user interaction with the scan controller operations. Such activity may be engaged by firmware in the scan controller communicating with the mobile phone to command such usage of its facilities. The result is a dramatic increase in utility while supporting usage in remote and hard-to-reach locations, exploiting the widely available mobile phone resource already carried in the field.

Another variation of the above is in FIG. 4J to further expand the mobile phone utility by engaging its capability to transport data in either direction with a remote base. This would greatly enhance the flexibility of this arrangement by allowing unlimited download of test procedures and uploads of test results, being connected with a central server with resources for data storage and post-processing.

An alternative of the above with identical topology for this invention could entail the migration of the mobile phone control function to the remote site on the network. In this fashion, the i/o resources of the mobile phone would interact under base server direction, possibly including downloaded applications into the mobile phone processor, which would then operate the attached scan controller to carry out its mission.

Further, in the various implementations disclosed herein, the stand-alone scan controller may also be of a form-factor to enable mounting directly to the target board, as in FIG. 4C, with its added functionality.

Figure 4K:
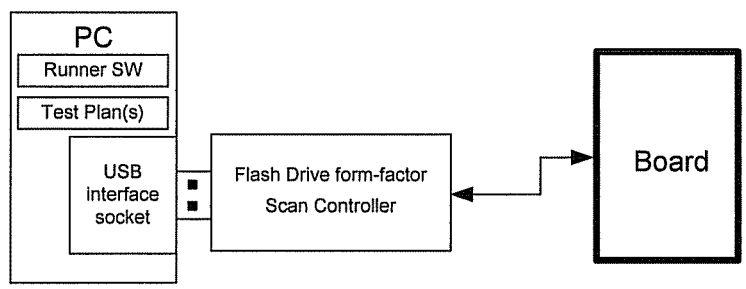
Figure 4L:
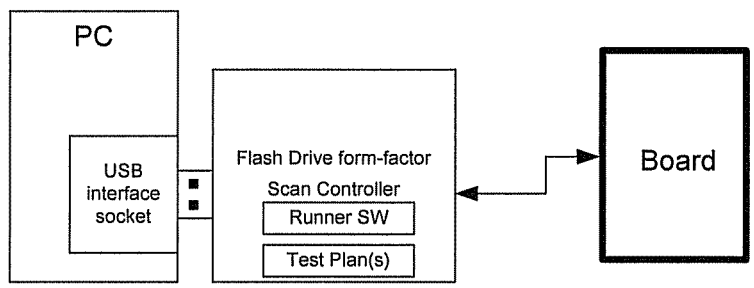
Figure 4M:
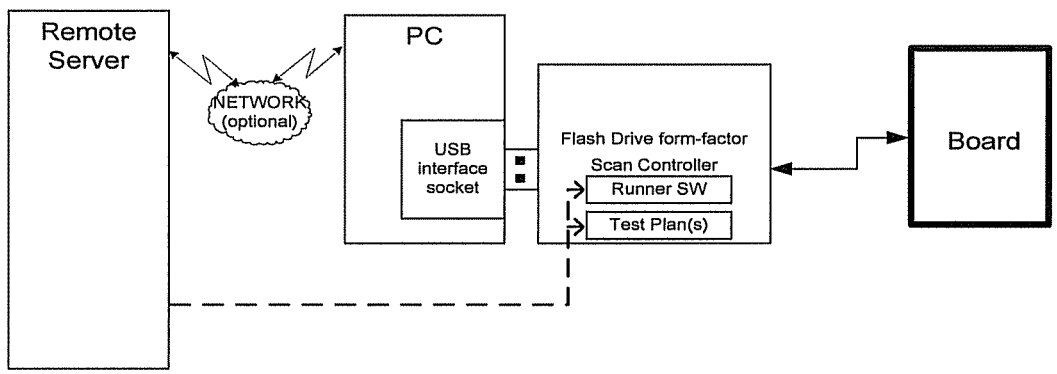

Additionally, as set forth in the exemplary implementations of FIGS. 4K, 4L, and 4M, the scan controller may be embodied within a modular construction, such as a portable/removable device that may have the form-factor of a flash or jump drive, etc., and may be connected to the computer in any manner consistent with such style devices, e.g., plugged directly into existing ports (via a USB socket, etc.), otherwise connected without a cable, etc. Such implementations may continue to use a traditional cable to connect such scan controller to the target board, though the connection to the target board may also be enabled via other means as well, such as by a wireless link from the scan controller to a wireless transceiver connected to the target board, etc.

FIG. 4K illustrates a basic implementation of such exemplary systems, wherein the scan controller is plugged directly into and completely operated via the PC. This implementation has different physical features than existing scan controllers, such as its highly compact and portable form-factor, and the lack of requirement for a cable between it and the PC (namely the USB cable). It may further contain memory storage resources to hold software components in the device, which can be uploaded to the PC in addition to the scan controller hardware. Such memory built into this scan controller device can contain one or more test plans fully enabling ready-to-go testing when plugged into any PC. It may further contain some or all of the local PC resident runner software elements such that by using auto-run methods of the operating system, any PC can be readied to perform boundary scan without prior setup. These memory resource may be built-in or may be removable (such as an MMC card) for easy alternative setup replacements. This version of scan controller, when fully configured with scanning hardware, memory storage containing auto-run-able scan runner software and test plan files, can provide a fully self-contained target test enabling product allowing any PC to immediately become a scan test station, without any special software pre-installation or network attachment.

Additionally, the stored memory may also be optionally upgrade-able by download from the host PC, if the latter contains alternative files of software and/or test plans, or has access to further obtain such via a network link from a remote server.

While the basic implementations may be configured to obtain test plans though a network from a remote server or already have them pre-installed (as in other configurations of scan controller), FIGS. 4L and 4M illustrate several additional aspects that may be realized separately, together, or in any combination (i.e., two or more of these features) with other implementations set forth herein.

As shown in FIG. 4L, for example, one or more test plans readable by the PC may be stored within the scan controller to be uploaded to the PC and utilized during the testing. Further, the scan controller may include visual indication or display elements, such as a screen or GUI, a simplified screen or GUI, LEDs, etc., that serve to provide information to the user regarding the status of the device and operation, as well as outcomes, results and/or information regarding the test scans.

Further, as shown in FIG. 4L and 4M, such storage within the scan controller may contain complete test software that enables one-step "plug and scan" of a target board, obviating the need for a remote server to run or manage the scans and/or, in some implementations, even avoiding the need to pre-install the runner application. In addition, the installation component that provides this functionality may support software methods that execute automatically under operating system management (such as Windows auto-run) when the scan controller is plugged-in. Such automatic installation components may install the software, provide icons for user selection, enable GUI functionality, and/or otherwise initialize the test software so that the local computing component is ready to perform test scans. Moreover, such memory storage resource in this scan controller may optionally include larger libraries or sets of appropriate test plans applicable to a variety of targets, instead of simply storing a particular test plan intended for a singular target board type.

Furthermore, as shown via the optional network elements in FIG. 4M, the scan controller may be connected to a remote server via a network such that all of the software elements and modules can be loaded, upgraded and monitored to make the devices more adaptable and otherwise enhance operation. Finally, any of these scan controller implementations can include a dongle that makes proprietary content (especially the runner software) secure, including defense against the pirating of the intellectual property resident there.

Remote Scan Controller Operation and Testing

In one implementation, host software 154 on the remote server 150 sends commands and bit stream vectors to the local PC 130 which then operates scanning via the scan controller using a standard port link method, such as, USB, Ethernet, internal PCI socket, etc. Over this same link, the local PC retrieves bit stream vectors extracted from the target chain. Some of this information may be used by the local PC for board integrity decision making and/or re-conveyed to the remote server 150 for additional processing. The remote host software 154 determines the sequence of each scan and the drive vector content to achieve its mission for a given test. It may interpret the retrieved vector content to determine conclusions from the chain devices' JTAG mechanism including any sensed pin signals, in combination with decision making by the local PC. This is used to report the behavior and integrity of the target board. It may further provide expected patterns for vectors scanned in from the target, expediting the board analysis processes at the local PC.

The above approach supports concentrating the frequent time-consuming multiple interactions between the local PC and the scan controller mainly in proximity to the board under test, avoiding sluggish network delays. Exchanges between the remote server and the local PC are greatly reduced in frequency, resulting in high performance behavior during scanning.

Figure 5:
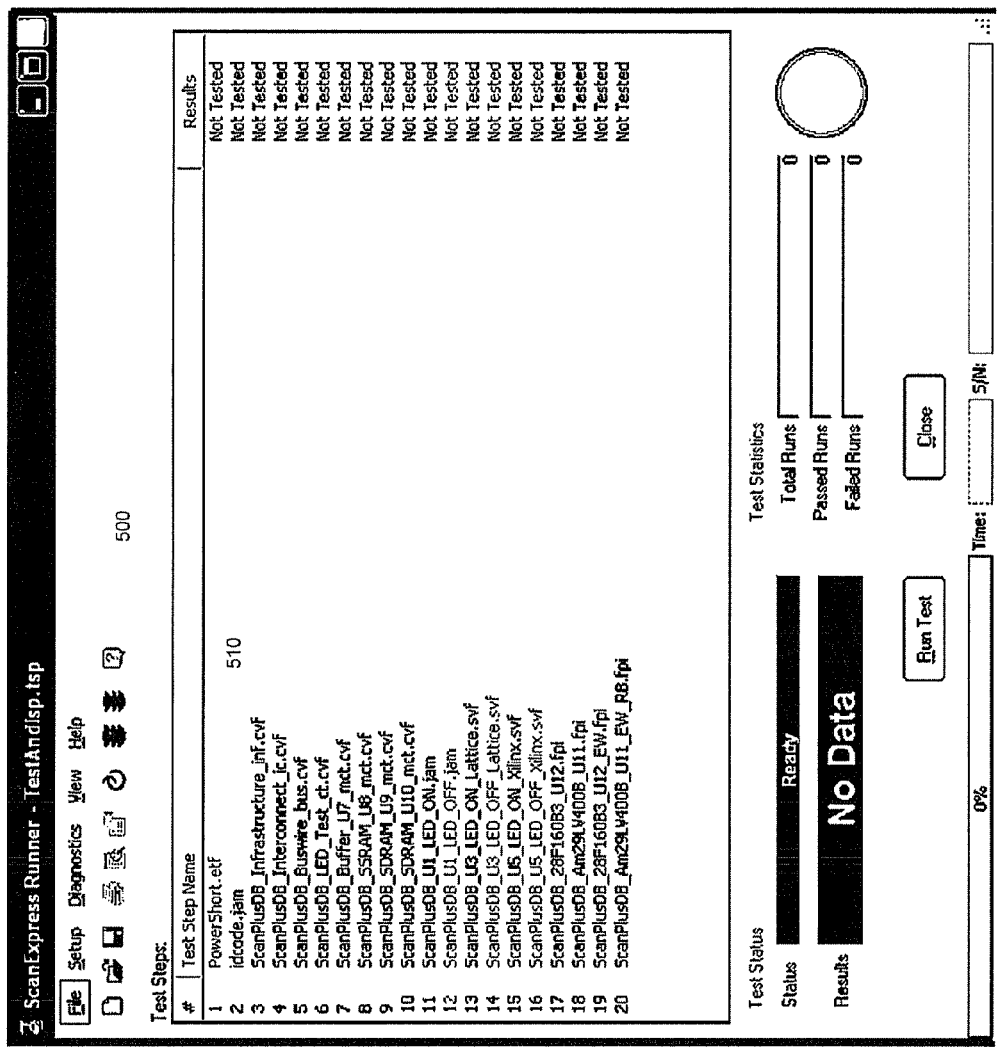
FIG. 5 is a diagram of a user interface illustrating a sequence of test scans according to an exemplary implementation.

Each test is comprised of multi-scan operations on a target board seeking to validate certain conditions, or to program non-volatile storage components (e.g. flash, CPLD logic, EEPROM memories), or otherwise interact with the target board. FIG. 5 is an illustration of an exemplary control screen 500, displayed on the local computing component 130 under operation from the remote server 150. Here, the exemplary control screen 500 lists a typical set of test plan steps 510. Each test step has a pass/fail determination reported, can be programmed to run multiple times, or can be excluded from the process by user selection. The entire set may be loaded from a single test plan file stored on the remote server 150, which in turn references the various individual step files (i.e. *.cvf, *.jam, *.fpi, etc., file types in the case of Corelis tools) with supporting data.

Host software 154 provides monitoring of overview functionality of the installed scan controller 120, while the local scan controller 120 carries out the bulk of the scan test steps, including multi-scan test steps. Various examples of remote server 150 overview functionality in the context of a common multi-scan test step are as follows. The remote server 150 receives updates and monitors whether critical infrastructure configurations are in place, using the local scan controller 120 checks, for example, confirming that the boundary scan chain itself is fully hooked up and can transfer all the way from the input to the output ends. The remote server 150 requests confirmations of interconnects, while the local scan controller 120 confirms, for example, that all nets which can be scanned are hooked up across the board as designed, and none are shorted to other distinct nets. The remote server 150 receives information regarding 'buswire' status, while the local scan controller 120 confirms, for example, whether these nets form buses, i.e., checking to see if they run as a group to multiple destinations and in multiple directions by various driver pins (some of which may both drive and receive), and checking for proper operation in all directions. In other words, the local scan controller confirms drivability at all points and reports to the remote server 150 regarding such net hookups, as above. Overview of other test functions may also be enabled, such as checking pull-ups/pull-downs (e.g., termination resistors which prevent some signals from floating at unknown states or improve signal transition properties are properly hooked up), memory (e.g., cluster testing to validate hookup and operation of non-JTAG devices whose pins can be access by other JTAG device pins), programming non-volatile devices (e.g., confirming status or loading new content into such devices to properly prepare the target for deliverable configuration, or upgrades), and other general operations available to JTAG signals.

Local PC to Scan Controller Interactions

Each scan step typically entails multiple scans of bit stream vectors into the chain, performed as an equal number of bits are shifted out toward the board, and shifted in from the board available for software examination. Different processing may be used to implement the two predominant types of scans, scan instruction register (SCAN_IR) and scan data register (SCAN_DR). These differ by how the incoming and outgoing streams are routed inside the devices to/from several internal shift registers. Other types of scans are also available, but the central focus is on these two types, as a matter of explanation.

SCAN_IR causes the vector bits via the TDI JTAG signal to route to an instruction register to be loaded with command/configuration codes into each device defined by the protocol. For example, certain commands codes configure the device to enable some pins to be driven as outputs during testing (bit levels to come later), while some pins are to be captured as inputs (sense the net attached), and other pins are to be floating (neither drive nor sense). Some overview commands may even tell the device to simply bypass most of these shift positions for future vector bit scans since they are not involved in upcoming scans, as the focus may be on other devices. This can shorten the chain length considerably and reduce test time, as some targets may have very long chains with many devices or with numerous pins. Thus, during a SCAN_IR cycle, each device is set-up for certain operations, while its status is also extracted.

In the SCAN_DR type of scan, the TDI JTAG signal bit stream takes on different meaning being routed to another device specific internal register. Some of this register's bits will feed corresponding pin drivers (after the shifting stops) with the final bit pattern appearing on these pin nets. Concurrently, some register bits are tied to pin inputs and will capture net levels from their attached pins, to be shifted back toward the PC via the TDO signal. Thus, the SCAN_DR type of scan shifts in the pattern of drive-able pin values for all devices in the chain, and concurrently shifts out sensed pin values for all devices in the chain. Using this type of scan, the scan controller can establish a pattern on driven JTAG device pins, and can observe the pattern on the sensed JTAG device pins, on any given scan throughout the board. This is enabled by the overall chain topology between all JTAG devices, where TDO from a given device feeds the TDI of the next until emanating from the last device TDO toward the scan controller. The first device's TDI is fed from the scan controller at the start of the chain.

Note that while patterns are shifted in/out through the chain of devices, related drive and sense pins are disconnected. Upon completion of the shifting, when the input pattern aligns with the intended pin, the drive patterns are loaded toward their respective pins. Similarly, shift positions corresponding to sense pins capture the current level on such pins into the shift register at a certain time, becoming available for subsequent shifting toward the scan controller. Thus, while the shifting is underway, device pins remain isolated from the shift registers, since the shifting values are mostly not aligned at a given time.

To cause each device JTAG interface to treat the TDI stream properly (e.g. to perform a SCAN_IR or SCAN_DR, for example, routing the bits accordingly inside all JTAG devices), the protocol defines specific states that the interface can be moved through. The TMS JTAG signal bit sequence, which drives all connected JTAG devices concurrently, causes the devices to transition through these states. This differs from the chained TDI and TDO since the scan controller drives all JTAG devices with this same signal in parallel in order to have them all transition through their JTAG states together. Thus, using a TMS vector, the scan controller (under direction of the remote server 150) distinguishes an upcoming SCAN_IR from a SCAN_DR (among other less-used types) by transitioning all devices in the chain to a certain state as required. Once the devices have reached an appropriate state (such as SHIFT-DR or SHIFT-IR, respectively, for example), the TMS signal can be held constant while the devices remain in such state, and now enables the shifting described above. Therefore, in general, scanning comprises of episodes of TMS transitions to establish a stable state of all JTAG devices, followed by TDI/TDO transitions (TMS held constant) to feed bit patterns to/from these devices.

FIG. 6 illustrates the protocol defined JTAG state diagram, whose state migration is performed by the local scan controller using sequential TMS signal values. By the appropriate sequence of TMS bits for subsequent TCK clocks, all connected devices will transition through these same states and end up as required by the controller. This includes certain stable states where the device JTAG state can remain for multiple clocks as other activities occur (such as SHIFT-DR or SHIFT-IR, . . . note that stable states have looping-back paths). While in one of these stable states (keeping TMS constant), the TDI bits can now be shifted through the data registers or instruction register, respectively, as described above.

For example, after power up devices are required to wake up in the initial TEST-LOGIC-RESET state. As long as TMS is 1, the devices will remain in that state even if the TCK clock is running. However, if the TMS sequence for each following clock is 0 1 1 0 0 0 . . . . 0 the devices will end up and remain in the SHIFT-IR state. They will remain in this state while TMS stays at 0 enabling the TDI bits to now be routed into the instruction register and the TDO bits to be shifted out from this register. When TMS finally changes to 1, the states can progress again, stepping to EXIT_IR. In this manner, the local scan controller puts all chain devices, concurrently, in whatever state it needs, including stable ones in which it can dwell many clocks. Then, while in a stable state, it shifts in/out TDI/TDO data streams as needed.

For most non-stable states (where a looping-back path is not defined), the value of TDI bits have no meaning (such as the SELECT-IR-SCAN state), while for others the TDI bits can supply information for the device pins or configuration registers (such as SCAN-DR or SCAN-IR). While in the SHIFT-IR state, for example, a protocol defined shift register (required by the specification . . . the Instruction Register) gets loaded on each TCK clock with the subsequent TDI bit levels. Concurrently, bit values already in this register are shifted forward emanating toward the TDO pin, to be shifted into the next device in the chain and ultimately ending up at the scan controller for host upload. By this method, all Instruction Registers of all devices in the chain can be loaded with new bit values, while their current bit values are extracted to the local scan controller, providing status information to report to the remote server 150. In particular, these registers hold important information telling each device how to behave during later shifting and how to treat its scan-able i/o pins. This is essentially the method that the scan controller (under direction of remote server 150) uses to configure and setup the JTAG resources in the device, for all devices, as well as learn of their status for reporting.

The other major state path brings all the devices to the SHIFT-DR state where the TDI bits now feed the actual bit levels for the various drive pins (those configured to drive or just filler bits for no-drive positions), while collecting and shifting toward the host the sampled pin levels of those net sensing positions. Stepping though this path locally enables the scan controller to fully load the Data Register shifter for all chain devices while completely extracting current contents for upload to the host. Therefore, the TDI stream includes pin drive update levels (in scan chain order) interleaved with don't-care bits (at input sense or floating positions), while the TDO stream brings out sensed pin levels (in scan chain order) interleaved with don't-care bits (at output drive or floating positions). The forgoing works because the devices were moved to the SHIFT-DR state.

The JTAG protocol standard defines the state transitions at which newly shifted in bits are latched to their configured drive pins, and input pins are captured by these registers for uplink shifting. For example, the shift registers will collect the bit vectors "in" from the chain but only drive their associated pin out at a certain point, namely when all devices have been finally filled with the aligned pattern, upon entry to a certain state (e.g. UPDATE-IR or UPDATE-DR). This finally loads the instruction register or applies their levels to the pins. Similarly, CAPTURE-IR or CAPTURE-DR states will cause the JTAG devices to sample the input pins or configuration information into their related shift registers for subsequent scan and upload to the scan controller toward the PC. Thus, the local scan controller is configured to interleave TMS state transitions of the devices (with TMS patterns) to go to appropriate states, and then with a TDI pattern for TDI/TDO insertion/extraction, as paced by TCK clocks, to avoid burdening the local PC with these detailed operations.

In some implementations, the remote server defines the needed scan operations at the high level to the local PC and supplies the TMS and TDI patterns for the scan controller, letting the latter handle the numerous clocking step sequences. Upon scan completion, the scan controller can then simply upload the collected TDO bits to the local PC, having further hidden the detailed steps, in an efficient high performance manner.

In general, the local test step algorithms consist mostly of a series of SCAN-IR and SCAN-DR scans, each progressing the devices through states, shifting in/out bit patterns, and then progressing the devices back to the stable start states again (either RUN-TEST-IDLE or TEST-LOGIC-RESET), ready for the next scan. The whole sequence of scans thus completes the test step. Further, other lesser-used auxiliary actions are available as needed, such SCAN_TO_PAUSE_IR or SCAN_TO_PAUSE_DR, which move the devices to intermediate stable states, for various purposes, such as forcing delay periods.

Overall, the remote software 154 directs the local components to initiate the test by interactions with the scan controller, while the latter typically performs the shifts for each scan, using the provided TMS and TDI vectors, in chain order, according to the total scan length. Information is also sent instructing the local scan controller to convey the collected TDO vector back toward the local computing component 130 for processing and/or transmission to the remote server 150, as necessary. Detailed operations of the local processing depends on the PC to scan controller interface port (USB, Ethernet, PCI bus, etc.) and the unique design of the local scan controller. In general, the downloaded scan test controller on the local computing component 130 manages the scan controller by manipulating a set of addressable control registers whose contents it can load or read over its port. By loading appropriate command and data registers over the port, it can instigate and provision various actions by the scan controller hardware, totally specific to its design. Conversely, it can read certain registers over this port to retrieve scanned in vectors or component status. FIG. 7 is a highly generalized block diagram of the registers 710 seen by the local computing component software, illustrating control/visibility of the scan controller and for passing vectors to/from it. Again, this is merely an illustrative block diagram, as the configuration of various local components may vary as described herein.

Further, when conveying the commands/status/vectors to/from the local scan controller 120, the PC also encodes/decodes these data items into the transfer formats appropriate for the port protocol. For example, command register information destined for the scan controller would be encapsulated into TCP/IP packets for Ethernet linked versions. The local elements must also be provided with and/or process additional information to direct the message to/from the destination/source inside the scan controller. In a similar manner, USB packets prepared for transmission contain similar information and formatting for that port according to its structures. The local components are also downloaded with software to manage all of handshake interactions on the bus according to the protocol underway. As such, in addition to creating the scan controller register contents, downloaded software on the local computing component 130 may create or unravel link related constructs and interact by appropriate protocol rules over the port. In some implementations, self-contained driver routines perform this job, which are dedicated to performing such communications, tailored to operate with installed PC port adapters, and available for download from the remote server 150.

When processing vectors in either direction, the scan controller registers 710 that store the vectors may be required to be very long or numerous, i.e., to support arbitrarily long target chains. In these situations, the scan controller 110 may implement them as an entire series of registers in the form of a FIFO (first-in-first-out) memory or other bulk memory storage method capable of storing large amounts of ordered data. Such a FIFO or buffer is typically required for target returned scan vectors, as well, holding them prior to shipment back to the local computing component 130 and/or remote server 150. To accommodate cases where the total vector length exceeds even such resources, mechanisms are also provided for the scan controller to pace itself due to storage limitations. In one implementation, for example, the scan controller momentarily halts target shifting if it needs new TDI vector bits and the FIFO is empty, or the TDO storage FIFO is full awaiting uplink to the PC, leaving no room to collect more from the target.

Figure 7B:
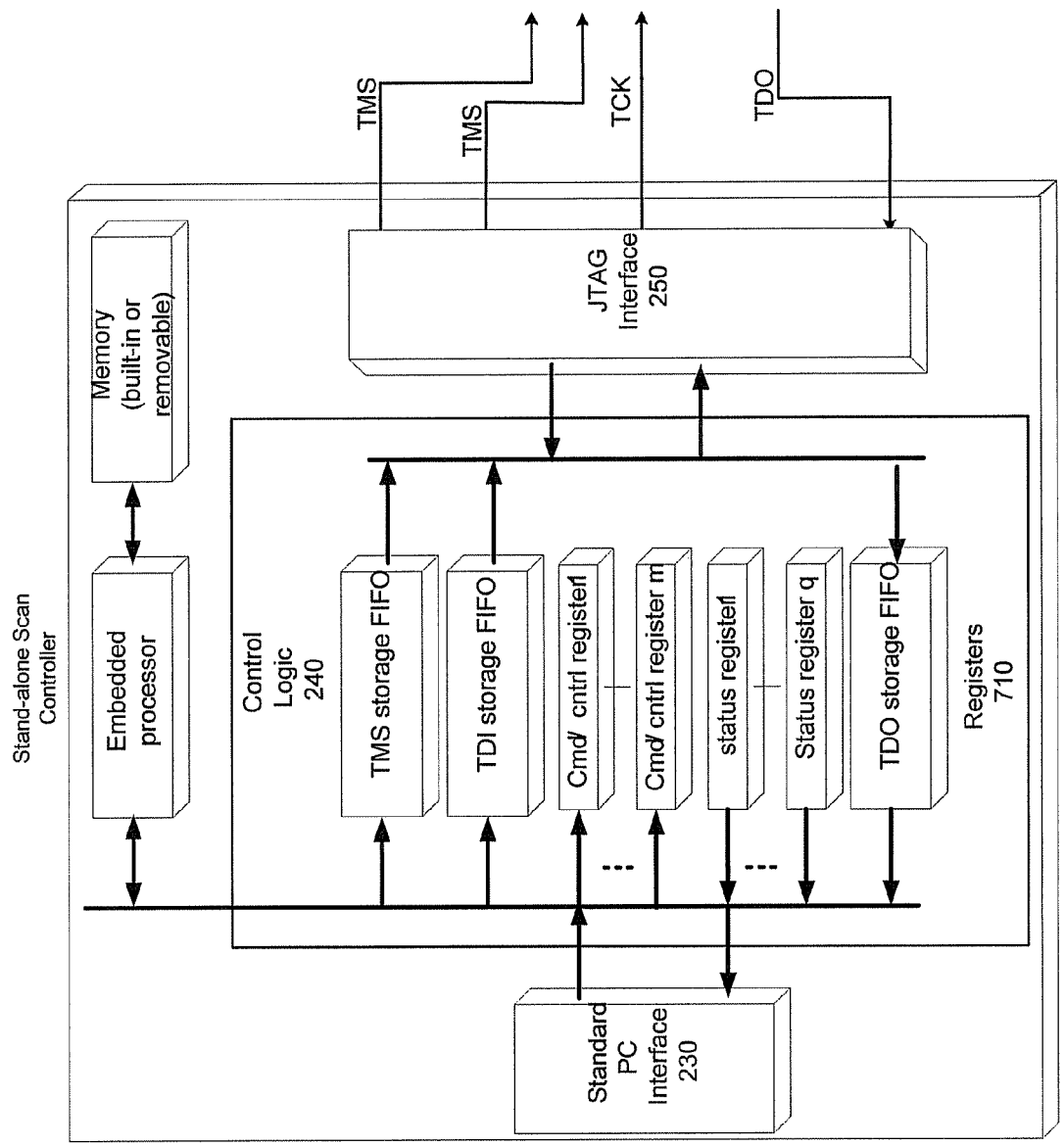
FIG. 7B is a block diagram of an exemplary local stand-alone scan controller, with common functional elements within for performing a boundary scan according to certain implementations, which may include pre-loaded test plans and/or added resources to enable scanning while not connected to a PC, saving of the test results for later upload, etc.

FIG. 7B shows a similar scan controller, of the stand-alone type, which includes added resources enabling operation without a computer while scanning the target. For example, it may contain an included processor and memory to support being pre-loaded with test plan information, operating on the target, and storing results for later up-linking to a host computer. The memory may be downloaded over the external port of the scan controller (typically USB) and/or installed using plug-in removable memory elements or via other such techniques. The converse applies when retrieving stored test results stored in memory elements. This supports a highly portable implementation, where access to the target circuit may be difficult or remote by obviating the need to attach a computer during the test scanning. Such embedded processor may also include firmware enabling it to control an attached mobile phone to operate its resources in the manner of a user i/o console. This could enable enhanced control and visibility of the scan controller operations by exploitation of a commonly available mobile phone handset typically carried by service personnel.

Figure 7C:
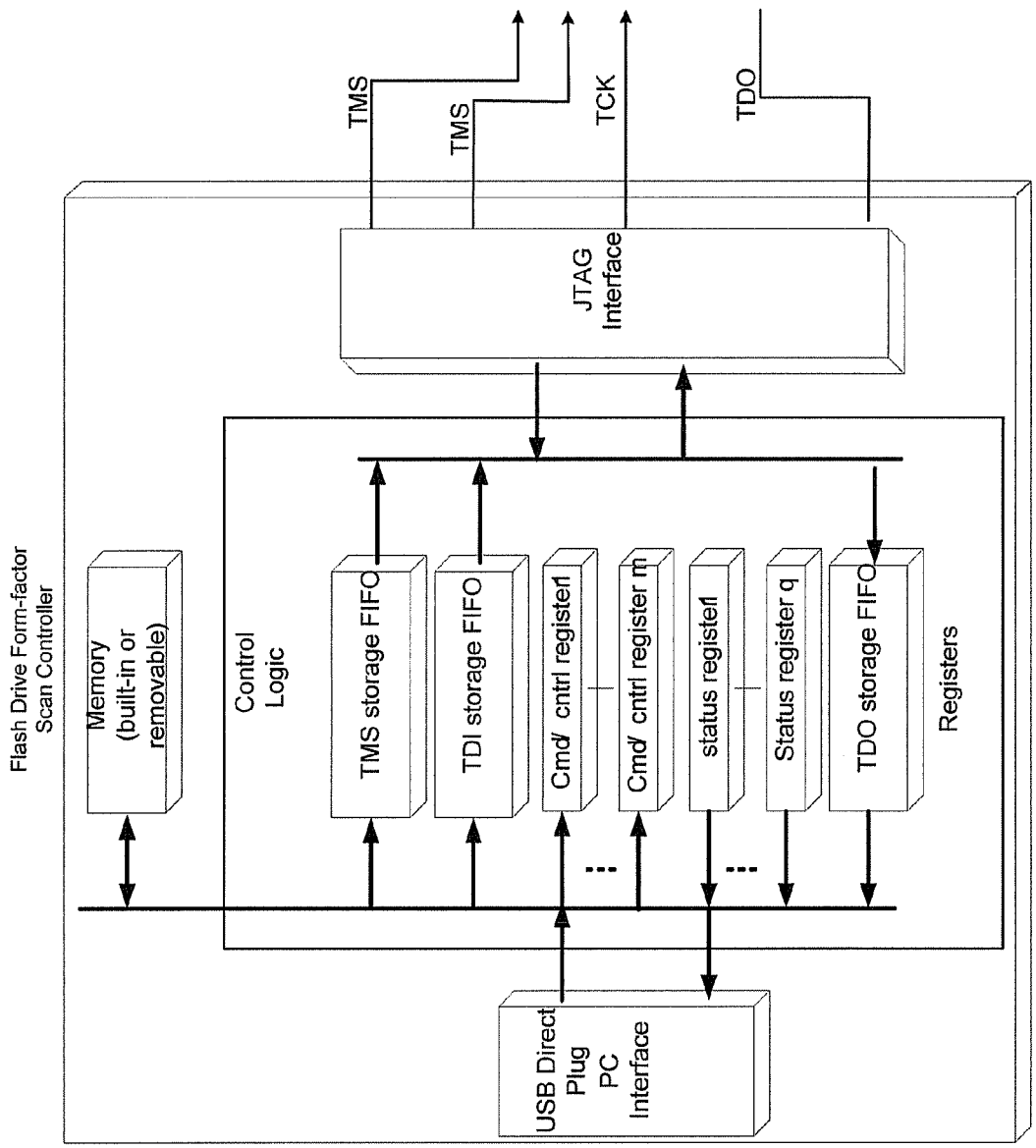
FIG. 7C is a block diagram of typical local flash drive form-factor scan controller, with common functional elements within for performing a boundary scan according to an exemplary implementation. This version plugs directly in a PC USB socket obviating the need for a cable between itself and this host processor. It may also contain memory (fixed or removable) to enable uploading to the PC of stored test plans and/or runner application software.

FIG. 7C shows another exemplary scan controller type, of the Flash Drive form-factor configuration, which may include added memory resources enabling the storage of test plan files and/or some or all of the runner software available for upload to the host PC. Such memory may also be loaded or reloaded with new test plan files or updated runner test software from the PC, including from a remotely connected server via a network. This supports high portability and agility for the scan controller device, and can also allow easy conveyance of test plans to a local test site. Furthermore, if preloaded with the runner application software, which can be uploaded to any plugged PC, it can provision any such PC, even if never initialized with runner test software, to, e.g., immediately become capable of scanning target devices. FIG. 4M, for example, shows a scan controller plugged and operated by its host PC, which may optionally be linked to a remote server as a source for updating test plans and/or the runner test software for download into the scan controller.

Distribution of Software Functions between Remote Server and Local Computer

According to higher-level web hosted test services consistent with the innovations herein, some software elements may be arranged and/or amended to augment the locally running boundary scan test functionality set forth above. This supports the rapid interactions between the local PC and the scan controller given its proximity while avoiding time-consuming and frequent network message transfers performed during the test steps. Concurrently, functions which enable web based operation that are not time-sensitive can be relegated to run in the remote server. Such distribution of processes keeps the user viewpoint that service is emanating from and controlled over the network, while high-speed control/response interactions with the scan controller remain transparently localized in the local PC, maintaining highly responsive behavior.

Figure 8:
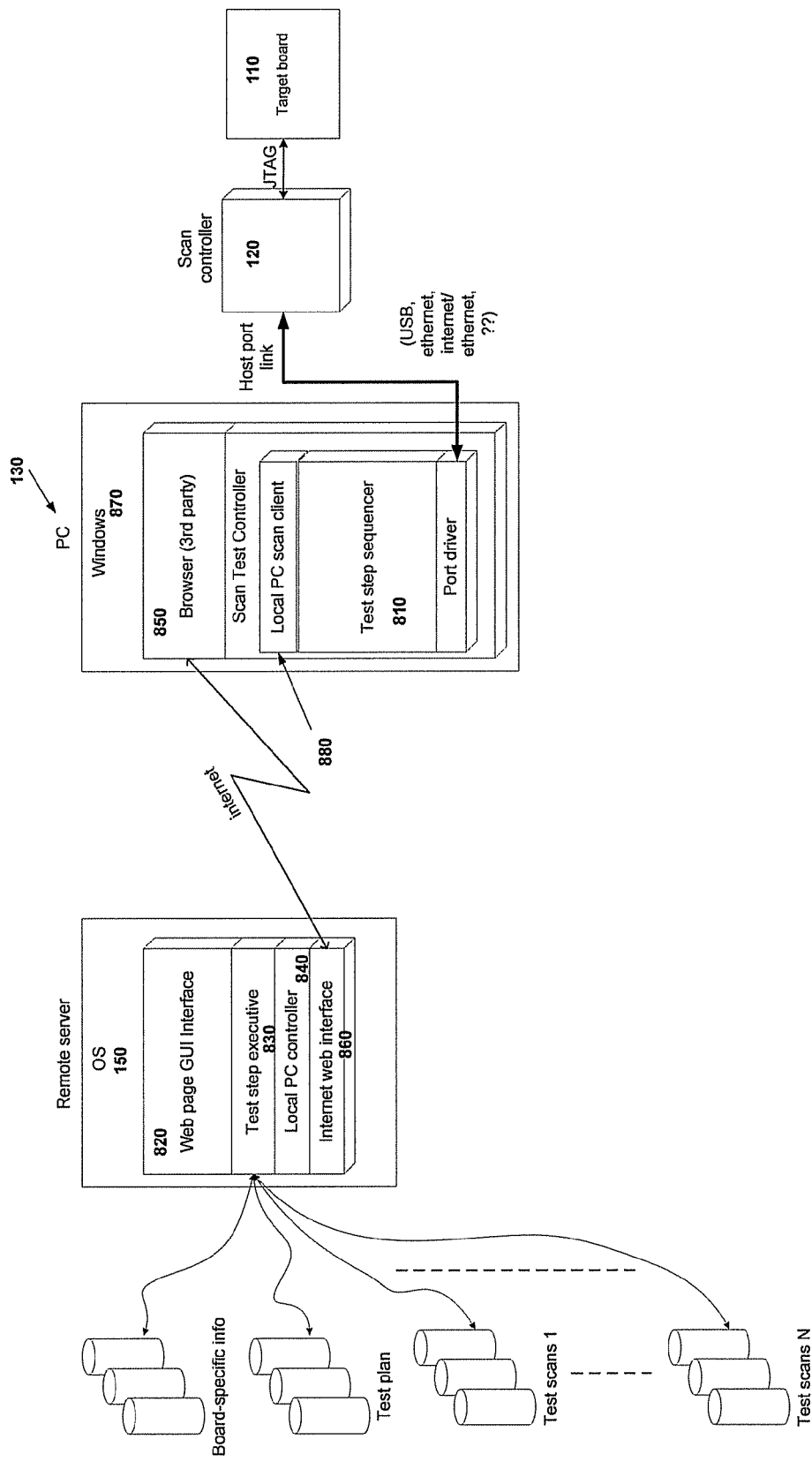
FIG. 8 is a block diagram of Web-based computing components with sub-elements distributed between the remote server computer and the local computer for performing a boundary scan according to an exemplary implementation for this invention.

FIG. 8 illustrates one implementation of software elements enabling such a solution, highlighting the distribution of software functions between the local PC and the remote web based server PC. This may apply equivalently to the case that the network is a mobile phone type with a remote processor performing management function via the local mobile phone hookup. The latter may include downloaded software to assist in this application, including operation of the attached scan controller. Here, the boundary scan components of the previous implementation are distributed between processors at either end of the network link to account for the high delays incurred for such communications exchanges. This arrangement minimizes frequent high rate traffic bursts over the network that may adversely and severely slow the performance. For example, Test Step Executive component 830 is employed to enumerate the individual scans at a high level, while detailed processing in regard to interactions with the scan controller is carried out in the local PC Test Step Sequencer 810, as so directed. This arrangement facilitates the concentration of the frequent high rate scan controller interactions as working only between the local PC and that external resource. That is, the web server manages macroscopic interactive screens and sessions for user visibility, while directing board tests at a high level, assuring minimal interaction over the network. Concurrently, the local PC receives high level direction and uplinks outcome information as it performs the intense high rate interactions with the scan controller to carry out the scan operations. The latter includes the numerous scan controller command/control, status registers and FIFO accesses needed to sequence its behavior.

At the other end of the network connection, the remote server 150, the Test Step Executive 830 (derived from the original Test Step software), needs to interact with the various test plan and board-specific files proximate to that server. This component 830 may also formulate and define the scan sequences to be carried out remotely. Another server component Local PC Controller 840, may also be implemented to create the formatted messages that govern the operations of the Local PC Scan Client 880, as well as to respond to high level outcomes sent back up, e.g., for user display. In addition, a Web Interface component 860 may be implemented for conveying information to/from the network as a web page server. This together with the PC browser software 850 form a communications link pair enabling the downward transfer of operational commands to the test step sequencer, and upward transfer of results back from the scans.

In one implementation, the Local PC Controller 840 in the server would download an entire test step scan procedure message to the local PC, such as to Scan Control component 860. This component in turn manages, scan-by-scan, the testing of the target including the processing of returned scanned-in vectors. This component may also perform pass/fail and fault localization decision-making about the target, and may also connect (up-link) such information to the server Local PC Controller 840. This, then, enables provision of information to the web page GUI for display to the user (back down via the browser). Accordingly, frequent interactions between the local PC and the scan controller are localized at that interface, minimizing the traffic required over the network. The less time-sensitive high level commands/vectors can be transferred as occasional blocks down the network, with summary conclusion information transferred back up, in background with lesser urgency.

As a highly simplified possible example of the downloaded constructs passed from the Local PC Controller 840 of the remote server to the Local PC Scan Client 880 in order to perform scans on the target, consider the following snippet of downloaded command messages (shown symbolically as text but may be binary codes);

```
SIR     38 TDI (3FFFFFFFFE)
        TDO (2544208901)
        MASK (3FEC7FFFE3);
SIR     36 TDI (16520FBFE)
        TDO (544208901)
        MASK (FEC7FFFE3);
SDR     160 TDI (FFFFFFFFFFFFFFFFFFFFFFFFFFFFFFFFFFFFFFFF)
        TDO (270320DD00610093174D61574205104909602093)
        MASK (FFFFFFF0FFFFFFFFFFFFFFFFFFFFFFFFF0FFFFFFF);
SIR     36 TDI (01D087FFD)
        TDO (544208901)
        MASK (FEC7FFFE3);
```

In this example, the SIR command means perform a SCAN-IR using these parameters. The latter commences with a bit count, with the TDI vector shown along with its bit values, in hex. Following that is an expected bit vector to apply to the returning TDO stream pattern, shown by hex values. After that, a mask bit vector is defined which identifies don't-care positions for the TDO stream such that the expected stream is not applied at zero positions.

Similar commands may also be implemented for SDR, declaring a SCAN-DR scan to be performed.

In the simplest actions, the Local PC Scan Client would order the Test Step Sequencer to manipulate the scan controller for each command in order to get the TDI vector into the board while the TDO vector is collected. Then the mask of the expected vector pattern is applied to such TDO vector seeking any mismatch. Further processing enables an outcome decision about the condition of the target board based on the nature of any such mismatch.

Other commands are envisioned to force the movement to certain JTAG states by the devices of the chain among others. In addition, the outcome decisions of the local PC may possibly be encoded back up to the remote server as follows;
SDR-MISMTCH 2 110 0
Meaning the $2^{nd}$ SDR command mismatched the expected pattern at bit position 110 having a scanned in value of 0.

In this example, the remote web server PC would be assigned the duty of interpreting this result and translating to a possible open or short of a particular set of nets, connected to certain device pins in the circuit. It would typically then modify the web page GUI to issue such a report to the user in a highly verbose manner to enable a specific outcome declaration (i.e. "U4 pin 3, net SRAM_CLK_EN1, seems shorted to U7 pin 17, net CPU_ADDR4").

FIG. 9 depicts various exemplary computer/controller components and associated messaging/functional features, according to certain exemplary implementations. Referring to FIG. 9, a simplified messaging time-line between a first computer 902 (also referred to as a server computer and first computing component/means), a second computer 904 (also referred to as a client computer and second computing component/means), and a scan controller 906 is shown in connection with sequential operations undertaken to perform boundary scan of the target board. As set forth in more detail above and herein, the first computer 902 may comprise means for maintaining or accessing a library of test scan procedures for a plurality of subject circuit boards, devices and/or systems, means for downloading at least one test scan procedure to a second computing means, and means for controlling the second computing means and the scan test controller/driver remotely. In some implementations, first computer 902 may include memory means, i.e., a data store or access to an external database that contains testing modules/software for installation in the other computing components. Examples of such modules/software, stored in this manner or otherwise obtained, include scan test controller drivers, means for providing a web page GUI interface to/for the second computing component 904, and means for downloading a port driver to enable the second computing means to perform the boundary scan via an input/output port interconnection, among others.

FIG. 9 shows a messaging time-line, beginning when the second computer 904 requests a testing web page 908 that is created 910 by the first computer 902, and then logs onto 912 and interacts with the first computer 902. The first computer 902, in turn, manages the top level scanning steps and/or directs the second computer 904 to perform numerous command/response exchanges with the scan controller. Consistent with one exemplary implementation, for example, the first computer 902 may initially perform various appropriate administrative functions 916, such as modifying the page(s) to be user specific, downloading test controller software or updates thereto, etc. Next, the second computer 904 connects with and initializes (if/as necessary) 920 the scan controller 906. At this time, the scan controller 906 may set up and/or connect 924 to the target board, though these steps may also be initiated later in the timeline. The second computer 904 then identifies the board type for testing 928 and communicates this information to the first computer 902, which obtains and downloads the relevant board-specific information and test plans 932, 936 to the second computer 904. With this information, the user is able to tailor desired test plans 940 via the test plan options presented, and present the desired test plan(s) to the first computer 902. At this time, the first computer 902 generates the tailored test plan(s) and presents them to the user 944, whereupon testing may be initiated 948 at the second computer 904.

In addition to such setup and commencement functionality, the first computer 902, the second computer 904 and the scan controller 906 are configured to execute a series of interactions and/or special commands 952, 956, 560 to implement the desired the scan(s) upon the subject board or boards. First, for example, the first computer 902 may prepare a series of steps for a first test scan and download a set of step scan commands to the, second computer 904. The second computer 904 then interprets these first set of scan commands and sequences the scan controller 906 to perform the scans. With regard to the scanning itself, various control/visibility registers with the scan controller 906 process JTAG signals, performing multiple TDI/TMS shifts toward the target, TDO shifts from the target, and other scan controller test functions. Next, the second computer 904 processes scan streams returned from the scan controller and uploads any appropriate returned streams, if commanded by the first computer 902. At this time, the first computer 902 is able to process the scan streams and responses and transmit the various outcomes, reports, etc. for use at the second computer 904, such as display of partial testing outcomes. Second, the computing elements 902, 904, 906 then progress through a series of intermediate scanning processes 976, 972, for the first test scan, consistent with those set forth above. And, third, the computing elements 902, 904, 906 prepare and implementing final scanning processes 978, again consistent with those of the first step above, to complete all board testing for the first test scan. Thereafter, the computing elements 902, 904, 906 prepare and perform a series of similar processes for the second test scan 980. Finally, the computing components 902, 904, 906 prepare and perform a similar processes 982, 984, 990 for any final test scans. At the completion of such testing, the server computer 902 prepares and transmits final reporting for the test outcomes 986, for use/display on the local computer 904.

With regard to some functional blocks that may be implemented, e.g., via software modules: the first or server computer 902 may include means for performing executive functions of the test scan controller 998; the second or local computer 904 may include means for controlling interactions with the scan controller 992, 994 (e.g., via special commands), test step sequencer means 994 for carrying out scans of the board or circuit under direction of the first computer 902, and means for reporting results 999 from scans to the first computer; and the scan controller 906 may include means for executing scans of circuit boards, devices and/or systems 996.

As an alternative example, interactions and/or special commands 952, through 982 need not be paced in time by respective second computer actions 972 through 984. That is, messages 952 through 984 can be conveyed as a block ahead of subsequent commanded actions in the second computer, which then can interpret and carry them out in order as paced by interaction requirements of the scan controller. These implementations allow an alternate approach in that the downloading of sequential step information from the remote to the local need not wait (be paced) by the latter's interactions with the scan controller. Such paced approach may be somewhat slowed due to the back and forth communications and intermediate waiting. In some instances, for example, information can be more efficiently downloaded entirely as a block, without feedback, letting the local computing component carry out the scan controller operations at it own rate (which is also paced by signals from the scan controller). In these cases, the downloaded block of step commands may reside in local PC memory, e.g., as or like a script program to be acted upon without further communications.

In general, the process of testing a board using JTAG involves the shifting into it sequential vector patterns while shifting out equal length vectors, to determine board integrity. There are two major activities involved, one of which entails relatively small amounts of information flow and while the other requires intense bursts of high rate information flow. The latter would typically incur a considerable performance penalty if conveyed over a wide access network link, such as the internet or mobile phone network.

The first activity involves software directing and managing the ordered sequence of scans supplemented by the vector patterns, prescribing the types of scans to perform (e.g. SCAN_IR or SCAN_DR), and providing expected values and positions of the returned scan bits, as defined by the test plan files. The second activity involves software manipulating the register resources in the attached scan controller device to carry out each such scan by producing and sensing the clock-by-clock electrical signals to/from the target.

Advantages and features consistent with the innovations herein relate to distributing the software processing between a local client PC (attached to the scan controller) and the remote server so as to optimize performance. This may be accomplished by keeping the communications between these two processing elements to a minimum so as to avoid the impact of the sluggish network. Thus, the first activity functions are mostly relegated to the remote server while the second activity functions are concentrated in the local PC. The remote server only requires limited conveyance rates of commands/responses over the network to instruct the local PC as to its high level operations and to exchange vectors. This contrasts with the local PC which employs high rate interactions with the proximate scan controller, at a detailed level The net result is to keep the network traffic minimized and performance maximized.

This method also reinforces features associated with keeping the proprietary test plan information located near and visible to the remote server (in the form of a target board-specific library), available for public test utilization without the need for local PC access. It further supports highly responsive operations as seen by the local end-user since the numerous and voluminous interactions with the scan controller do not include the network delays.

FIGS. 10A-10D are diagrams illustrating exemplary arrangements associated with boundary scanning, according to certain exemplary implementations. These figures depict how this invention enables a different cost structure and a reduction in utilization costs for such software tools via JTAG exploitation, for example.

FIG. 10A is a diagram of an existing arrangement used to run boundary scans, such as when a test plan developer buys 1007 test generation (runner test tool) software 1005 for unlimited usage and test runner user buys 1017 test execution software 1015 for unlimited usage. Thus the test plan developer can create unlimited test plans 1010. Test plans 1010 can be used in an unlimited manner by software 1015 to run scans. Such arrangements, however, are typically high-cost and often prohibitive, mainly due to the need to purchase the tools outright. The test plan generation tools are typically purchased separately by the circuit board developer/manufacturer enabling the test plan files creation. The output of such tools, the test plan files, now enable the run-time testing of the board using the runner tools. The runner tools are typically purchased by the developer/manufacturer also, to verify such test plans, and to facilitate initial debug and production testing of their product circuit board. In addition, circuit board end-users and maintenance personnel might purchase such for field repair and upgrades at the deployment point. Since in the conventional manner, such tools and/or usage licenses are purchased, they remain perpetually available for re-application for multiple products and versions of boards. This figure also emphasizes the point of revenue generation and customer expense for this manner of usage (dollar signs).

Figure 10D:
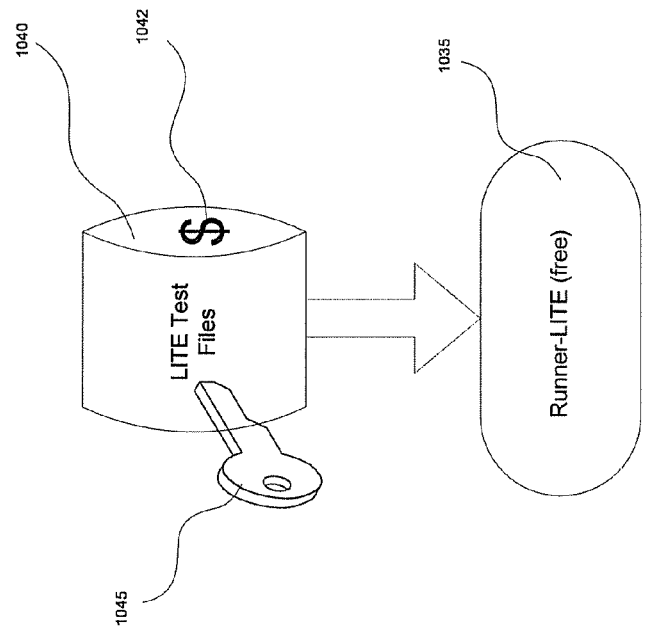
Figure 10C:
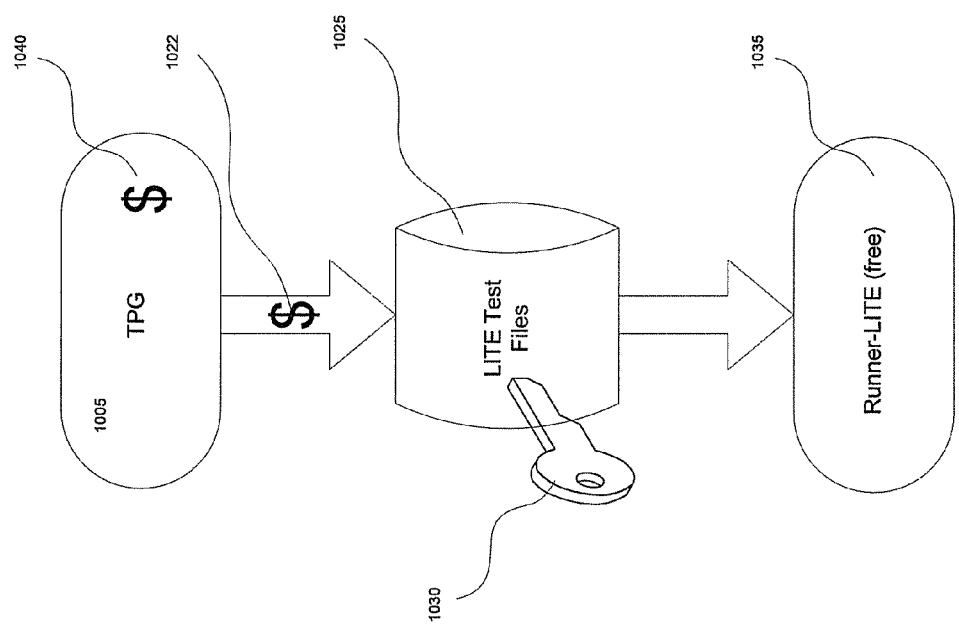

Further, FIGS. 10B-10D illustrate usage of the test plan generation tool and the runner test tool, whether or not the tool is operated via network or installed on a user's local PC directly. In these implementations, for example, a test plan user secures rights to develop test plans, with the associated software being obtained in a variety of fashions, e.g., on-line, downloaded, or CDROM installed into his personal computer or computing device. Here, however, the rights specify certain licensing conditions, including charges for developing test plans being set according to one or more restricted use conditions, such as per session, as a function of time, with regard to the board or boards type/model targeted, etc. Further, test plan users may check-in developed test plans to a web server library or distribute them directly as they wish, i.e., to target customers, their own in-house test users, or others who wish to run the scans. As shown in FIG. 10B, these arrangements or methodologies may also have a unique, less-extensive (LITE) test developer software component 1020, where production of resulting test plans may require a usage-based revenue license (which, again, may be charged as a function of session/time/specific-target/etc.). Further, a LITE runner tool, which could only use test plans from a LITE test files component 1025, may be run via a web server or locally installed with a license to use (which might be low-cost or free to encourage manufacturers to use this method). Various implementations are shown in FIGS. 10B-10D, and a summary of some nuances of the innovations here are set forth in Table 1.

In FIG. 10B, the test pattern generator tool 1020 is provided for lower cost or even for free. Revenue 1022 is collected based on use of the test pattern generator tool to produce test plans 1025. The test plans 1025 are accessed through key 1030. Runner software 1035 can run the test plans at a lower cost or even free of charge.

FIG. 10C shows a similar scheme. However, a charge is also made for use or purchase of test plan development software 1040. FIG. 10D illustrates aspects such as paying 1042 for pre-generated test plans 1040 for use by runner LITE software 1035.

TABLE 1

| | Tool | Standard Method | Innovations |
|---|---|---|---|
| 1. | Test Pattern Generator Tool | Paid for license | TPG-LITE - FREE tool |
| 2. | Generating Test Plan Files | FREE | Pay-per-use - you pay every time you generate LITE test files |
| 3. | Test Runner Tool | Paid for license | Runner-LITE - FREE tool |

Overall, such innovations may even be distinct from remote and web-based innovations set forth above. The implementations and innovations charge those who generate test plans (costs often borne by manufacturer), while eliciting little or no charge to end users that merely run the tests on target boards/devices. Further, such implementations can be employed with both web based approaches and fully downloaded or distributed media installations, as well, including combinations thereof.

A key benefit of the foregoing features and innovations is the enablement of end-users to have negligible or no costs to test their boards, although they still need scan controllers, which can be of a low-cost type and may be shared among many of their boards. This could result in the adoption of JTAG as a widely used field maintenance method given the ready availability and low cost access to the test plan, over and above the prior art's emphasis on manufacturing and production.

Stand-alone Scan Controller Methods

Exemplary implementations of scan controllers may facilitate performing boundary scan function on target circuits for which proximity to a computer is not convenient. These implementations require a scan controller of somewhat greater capability in that a minimal internal processor along with memory storage is available. This allows the test plan related information to have been downloaded and recorded therein at some time prior to actual scanning. The embedded processor can then be activated to manage the scanning without the computer connection at this location, while recording results in similar memory for later up-linking and post-processing. Such download and upload actions may be provided via an i/o port similar to above (such as USB) when hooked to an external computer. Removable memory, which can be loaded and retrieved via external equipment, may also be included.

Other implementations of the above may include additional control fix firmware for the processor to enable communications over the i/o port with an external mobile phone. Such mobile phone may then be managed to provide a control/visibility resource to the user for enhanced setup and monitoring of the scan controller. This provides the screen, buttons, controls, and sound i/o elements of the mobile phone as an augmentation to the scan controller functions.

In addition to enhancing the supervisory features, the above mobile phone implementations also enable the transport of information to/from a remote sever resource on the mobile network. This further facilitates the download of alternate test plans and the upload of results, during the scanning cycle, greatly adding to test time flexibility.

Still other innovations support implementations where the remote server resource on the mobile network directly manages the mobile phone, including the usage of downloaded routines, to operate it from the remote site. Such features alleviate the requirement for the stand-alone scan controller to operate the mobile phone, simplifying its capability needs to a lower complexity version as in the above cases. In such arrangements, the user i/o resources of the mobile phone may be placed under control of the remote server.

In the present description, the terms component, module, sequence, and functional unit, may refer to any type of logical or functional process or blocks that may be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) to be read by a central processing unit to implement the functions of the innovations herein. Or, the modules can comprise programming instructions transmitted to a general purpose computer or to graphics processing hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, embodiments and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe components such as software, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard mobile-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Other embodiments of the invention will be apparent to those skilled in the art from consideration of the specification and practice of the invention disclosed herein. It is intended that the specification and examples be considered as exemplary only, with a true scope and spirit of the invention being indicated by the disclosure above in combination with the following paragraphs describing the scope of one or more embodiments of the following invention.

The systems and methods disclosed herein may be implemented as a computer program product, i.e., a computer program tangibly embodied in an information carrier, e.g., in a machine readable storage medium or element or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

The invention claimed is:

1. A method of enabling end users to perform boundary scans of circuit boards, devices or systems, the method comprising:
   providing, by a custodian of test and board information, a first license that gives a test plan developer permission to develop test plans for a charge, wherein the first license gives the test plan developer restricted conditional access to a set of test plan development software tools necessary to produce test plan files that characterize boundary scan testing information regarding particular electronic circuits;
   providing a second license that gives a test runner user both permission to perform boundary scan tests on circuit boards, devices or system and restricted conditional access to a set of test plan runner software tools; and
   issuing computerized instructions, via a networked computer system, that enable the test plan developer to make available, to the test runner user, a set of test plan files that are produced for and enable testing of one or more specific circuit boards, devices or systems.

2. The method of claim 1 wherein the second license also gives the test runner user restricted conditional access to test plan files, available from test plan developers, associated with the set of test plan runner software tools.

3. The method of claim 2 wherein the test plan files are saved in storage media.

4. The method of claim 2 wherein the test plan files are downloaded by or conveyed to the test runner user.

5. The method of claim 1, wherein the one or more conditions includes charging the test plan developer for the use of software tools as a function of a software usage occurrence session.

6. The method of claim 1, wherein the one or more conditions includes charging the test plan developer for the use of software tools as a function of time used of such usage.

7. The method of claim 1, wherein the one or more conditions includes charging the test plan developer for the use of software tools as a function of developing a test plan applicable to a particular single type of circuit board, device, or system via such software usage.

8. The method of claim 1, wherein the one or more conditions includes setting up a charge regime for use, by the test runner user, of the software tools as a function of an occurrence session of testing a circuit.

9. The method of claim 1, wherein the one or more conditions includes setting up a charge regime for use, by the test runner user, of the software tools as a function of time used while testing a circuit.

10. The method of claim 1, wherein the one or more conditions includes setting up a charge regime for use, by the test runner user, of the software tools as a function of testing a particular type of circuit board, device, or system.

11. A portable scan controller device configured to enable performance, by a computing component to which the scan controller device is directly attached, of boundary scans on a circuit board, device and/or system, the scan controller device comprising computer readable media including computer readable instructions executable by one or more processing components for:
- accessing a library of test scan procedures, each including test operands and associated output patterns, wherein the test scan procedures are designed for verifying correct electrical operation of a plurality of subject circuit boards;
- downloading at least one of the test scan procedures to the scan controller device;
- providing, to the computing component, scan control information that enables the computing component to perform test scans; and
- enabling remote processing, by a remote computing component, of test results from the test scans such that only user inputs, initial scanning directions from the first computing component, and test results need to be transmitted over the network between the second computing component and the first computing component, the test results being transmitted via a network from the computing component to the remote computing component.

12. The scan controller device of claim 11 wherein the scan controller device is configured with a USB connector to directly couple the scan controller device to a USB port of the computing component without the need for a PC cable.

13. The scan controller device of claim 12 wherein the computing component is a PC.

14. The scan controller device of claim 11 wherein the scan controller device is configured to be directly connectable via a dedicated cable or via a wireless element.

15. A scan controller device of claim 11 wherein the computer readable media further includes computer readable instructions executable by one or more processing components for:
- providing to the second computing component, scan control target information, such as test plans, that enables the computing component to perform test scans on one or more specific target board types.

16. The scan controller device of claim 11 wherein the computer readable media further comprises computer readable instructions for:
- providing one or more test plans for use by the computing component to perform scanning.

17. The scan controller device of claim 11 wherein the computer readable media further comprises computer readable instructions for:
- providing fully-functioning test scan software to the computing component, such that no additional information or outside connection is required to perform test scanning by interpreting available target test plans.

18. The scan controller device of claim 17 wherein the computer readable media further comprises computer readable instructions for:
- automatically installing the fully-functioning test scan software so it is ready for use.

19. The scan controller device of claim 11 further comprising hardware that includes one or more indicating elements that provide visible indicia to a user regarding test information and/or processing status and/or test outcomes.

20. The scan controller device of claim 11 further comprising a dongle that makes operation of the scan controller secure and/or serves to defend against the pirating of the intellectual property resident on the scan controller memory storage.

* * * * *